United States Patent
Suzuki et al.

(10) Patent No.: US 12,497,688 B2
(45) Date of Patent: *Dec. 16, 2025

(54) BARRIER LAMINATE, HEAT SEALING LAMINATE INCLUDING BARRIER LAMINATE, AND PACKAGING CONTAINER WITH HEAT SEALING LAMINATE

(71) Applicant: DAI NIPPON PRINTING CO., LTD., Tokyo (JP)

(72) Inventors: Tsuyoshi Suzuki, Tokyo (JP); Shohei Okumura, Tokyo (JP); Shunsuke Furuya, Tokyo (JP); Hideaki Takahashi, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 698 days.

This patent is subject to a terminal disclaimer.

(21) Appl. No.: 17/765,326

(22) PCT Filed: Sep. 29, 2020

(86) PCT No.: PCT/JP2020/036821
§ 371 (c)(1),
(2) Date: Mar. 30, 2022

(87) PCT Pub. No.: WO2021/065878
PCT Pub. Date: Apr. 8, 2021

(65) Prior Publication Data
US 2022/0396870 A1    Dec. 15, 2022

(30) Foreign Application Priority Data

Sep. 30, 2019  (JP) ................................ 2019-180872

(51) Int. Cl.
   *C23C 16/02*     (2006.01)
   *B65D 65/42*     (2006.01)
   (Continued)

(52) U.S. Cl.
   CPC .......... *C23C 16/0272* (2013.01); *B65D 65/42* (2013.01); *C09D 7/61* (2018.01);
   (Continued)

(58) Field of Classification Search
   None
   See application file for complete search history.

(56) References Cited

U.S. PATENT DOCUMENTS

| 5,942,320 A | 8/1999 | Miyake |
| 2018/0009206 A1 | 1/2018 | Murase |

FOREIGN PATENT DOCUMENTS

| CN | 1176173 | 3/1998 |
| EP | 3305682 | 4/2018 |

(Continued)

OTHER PUBLICATIONS

Machine translation of JP 2017-211082 A (Year: 2017).*

(Continued)

*Primary Examiner* — Ramsey Zacharia
(74) *Attorney, Agent, or Firm* — HSML P.C.

(57) ABSTRACT

[Object] To provide a barrier laminate that includes a multilayer substrate with high interlayer adhesiveness to an evaporated film and that has high gas barrier properties.

[Solution] A barrier laminate according to the present invention includes a multilayer substrate and an evaporated film, wherein the multilayer substrate includes at least a polypropylene resin layer and a surface coating layer, the polypropylene resin layer is subjected to a stretching process, the surface coating layer contains a resin material with a polar group, and the evaporated film is composed of an inorganic oxide.

9 Claims, 10 Drawing Sheets

(51) Int. Cl.
  *C09D 7/61*      (2018.01)
  *C09D 123/08*    (2006.01)
  *C09D 123/12*    (2006.01)
  *C09D 129/04*    (2006.01)
  *C09D 133/10*    (2006.01)
  *C09D 175/04*    (2006.01)
  *C09D 179/02*    (2006.01)
  *C23C 16/40*     (2006.01)

(52) U.S. Cl.
  CPC ..... *C09D 123/0892* (2013.01); *C09D 123/12* (2013.01); *C09D 129/04* (2013.01); *C09D 133/10* (2013.01); *C09D 175/04* (2013.01); *C09D 179/02* (2013.01); *C23C 16/401* (2013.01); *C23C 16/403* (2013.01); *B65D 2565/387* (2013.01)

(56) References Cited

FOREIGN PATENT DOCUMENTS

| | | |
|---|---|---|
| JP | 10-29263 | 2/1998 |
| JP | 10-76593 | 3/1998 |
| JP | 10-264292 | 10/1998 |
| JP | 11-157021 | 6/1999 |
| JP | 2000-254994 | 9/2000 |
| JP | 2000-263722 | 9/2000 |
| JP | 2003-277677 | 10/2003 |
| JP | 2005-053223 | 3/2005 |
| JP | 2005-178805 | 7/2005 |
| JP | 2005-231039 | 9/2005 |
| JP | 2006-062115 | 3/2006 |
| JP | 2008-44111 | 2/2008 |
| JP | 2008-049605 | 3/2008 |
| JP | 2008-132761 | 6/2008 |
| JP | 2009-154449 | 7/2009 |
| JP | 2011-214089 | 10/2011 |
| JP | 2012-076292 | 4/2012 |
| JP | 2014-208443 | 11/2014 |
| JP | 2014-531341 | 11/2014 |
| JP | 2017-211082 | 11/2017 |
| JP | 2018-113274 | 7/2018 |
| JP | 2019-143000 | 8/2019 |
| JP | 2021-503037 | 2/2021 |
| JP | 6895135 | 6/2021 |
| WO | 2015087976 | 6/2015 |
| WO | 2016158794 | 10/2016 |
| WO | 2018/168671 | 9/2018 |
| WO | 2019/087960 | 5/2019 |
| WO | 2020/045629 | 3/2020 |

OTHER PUBLICATIONS

Machine translation of JP H10-264292 A (Year: 1998).*
International Preliminary Report on Patentability, issued in the corresponding PCT application No. PCT/JP2020/036821, dated Apr. 5, 2022, 6 pages.
Japanese Written Opinion, issued in the corresponding Japanese Patent No. 7100830 (Objection No. 2023-700022) dated Feb. 16, 2024, 26 pages with machine translation.
Japanese Office Action, issued in the corresponding Japanese patent application No. 2021-102706, dated Apr. 12, 2022, 13 pages.
International Search Report, issued in the corresponding PCT application No. PCT/JP2020/036821, dated Dec. 8, 2020, 7 pages.
Third Party Observation, issued in the corresponding PCT application No. PCT/JP2020/036821, dated Aug. 6, 2021, 5 pages.
Chinese Office Action, issued in the corresponding Chinese patent application No. 202080068252.1, dated May 23, 2023, 29 pages with machine translation.
Japanese Notice of Reasons for Refusal, issued in the corresponding Japanese patent application No. 2022-106467, dated Jun. 27, 2023, 26 pages with machine translation.
Japanese Notice of Reasons for Revocation, issued in the corresponding Japanese patent No. 7100830, dated Jul. 14, 2023, 18 pages with machine translation.
Japanese Opposition, issued in the corresponding Japanese Patent No. 7100830 (Objection No. 2023-700022), (Opposition's Shipping No. 076777), dated Aug. 22, 2024, 116 pages with machine translation.
Case for requesting the revocation of a decision to revoke a patent, (Case No.) 10091, (Te-Ke), 2023, 73 pages with machine translation.
Extended European Search Report of (Application No. 20870524.4) Sep. 20, 2023, 12 pages.
European Office Action, issued in the corresponding European patent application No. 20870524.4, dated Dec. 20, 2024, 8 pages.
Decision on Opposition (Opposition No. 2022-700021, Shipping number No. 094825), dated Oct. 31, 2024, 59 pages with the machine English translation.
Notice of Dispatch of Duplicates of a Written Statement (Opposition No. 2022-700021, Shipping number No. 101608), dated Oct. 31, 2024, 16 pages with an English abstract.

* cited by examiner

BARRIER LAMINATE, HEAT SEALING LAMINATE INCLUDING BARRIER LAMINATE, AND PACKAGING CONTAINER WITH HEAT SEALING LAMINATE

TECHNICAL FIELD

The present invention relates to a barrier laminate, a heat sealing laminate including the barrier laminate, and a packaging container with the heat sealing laminate.

BACKGROUND ART

Films formed of polyesters, such as poly(ethylene terephthalate), (hereinafter also referred to as a "polyester film") have good mechanical characteristics, chemical stability, heat resistance, and transparency, and are inexpensive. Thus, polyester films have been used as substrates constituting laminates used to produce packaging containers.

Depending on the contents to be filled in a packaging container, the packaging container is required to have gas barrier properties, such as high oxygen barrier properties and high moisture barrier properties. To satisfy this requirement, an evaporated film containing alumina, silica, or the like is often formed on the surface of a polyester film of a packaging container (PTL 1).

In recent years, resin materials that can substitute for polyester films have been researched, and the application of a polyolefin film, particularly a polypropylene film, to a substrate has been studied.

CITATION LIST

Patent Literature

PTL 1: Japanese Unexamined Patent Application Publication No. 2005-053223

SUMMARY OF INVENTION

Technical Problem

The present inventors have studied the use of a stretched film of polypropylene (hereinafter also referred to as a stretched polypropylene film) instead of known polyester film substrates. On the basis of study results, the present inventors have found a new problem that even an evaporated film formed on the surface of a stretched polypropylene film cannot have satisfactory gas barrier properties.

On the basis of further study results, the present inventors have found that a packaging container with a laminated film having an evaporated film formed on the stretched polypropylene film exhibits a characteristic phenomenon that is not observed in known laminated films with a polyester film substrate, that is, interlayer separation between the stretched polypropylene film and the evaporated film, and the phenomenon impairs gas barrier properties.

The present inventors have also found that a surface coating layer containing a resin material with a polar group on the surface of a stretched polypropylene film can improve the adhesiveness of an evaporated film formed on the surface coating layer and also improve the gas barrier properties.

The present invention has been accomplished on the basis of these findings and aims to provide a barrier laminate that has a multilayer substrate with high interlayer adhesiveness to an evaporated film and that has high gas barrier properties.

It is another object of the present invention to provide a heat sealing laminate including the barrier laminate.

It is another object of the present invention to provide a packaging container with the heat sealing laminate.

Solution to Problem

A barrier laminate according to the present invention includes a multilayer substrate and an evaporated film,
wherein the multilayer substrate includes at least a polypropylene resin layer and a surface coating layer,
the polypropylene resin layer is subjected to a stretching process,
the surface coating layer contains a resin material with a polar group, and
the evaporated film comprises an inorganic oxide.

The barrier laminate may further include a barrier coating layer on the evaporated film.

The barrier laminate may be a barrier laminate including a multilayer substrate, an evaporated film, and a barrier coating layer,
the barrier laminate includes a barrier coating layer on the evaporated film,
wherein the multilayer substrate includes at least a polypropylene resin layer and a surface coating layer,
the polypropylene resin layer is subjected to a stretching process,
the surface coating layer contains a resin material with a polar group,
the evaporated film comprises an inorganic oxide, and
the ratio of silicon atoms to carbon atoms (Si/C) on a surface of the barrier coating layer measured by X-ray photoelectron spectroscopy (XPS) is 1.60 or less.

In the barrier laminate, the surface coating layer may have a thickness in the range of 0.08% to 20% of the total thickness of the multilayer substrate.

In the barrier laminate, the surface coating layer may have a thickness in the range of 0.02 to 10 μm.

In the barrier laminate, the resin material may be at least one resin material selected from ethylene vinyl alcohol copolymers (EVOHs), poly(vinyl alcohol) (PVA), polyesters, poly(ethylene imine), (meth)acrylic resins with a hydroxy group, nylon 6, nylon 6,6, MXD nylon, amorphous nylon, and polyurethanes.

In the barrier laminate, the surface coating layer may be a layer formed using an aqueous emulsion or a solvent emulsion.

The barrier laminate may be used for a packaging container.

In the barrier laminate, the inorganic oxide may be silica, silicon carbide oxide, or alumina.

A heat sealing laminate according to the present invention includes the barrier laminate and a sealant layer.

In the heat sealing laminate, the sealant layer comprises the same material as the polypropylene resin layer, and the same material is polypropylene.

A packaging container according to the present invention includes the heat sealing laminate.

Advantageous Effects of Invention

The present invention can produce a packaging container that has high interlayer adhesiveness between a polypropylene film and an evaporated film and has high laminate strength, and can provide a barrier laminate with high gas barrier properties.

The present invention can provide a heat sealing laminate including the barrier laminate.

The present invention can provide a packaging container with the heat sealing laminate.

DESCRIPTION OF EMBODIMENTS (Barrier Laminate)

Figure 1:
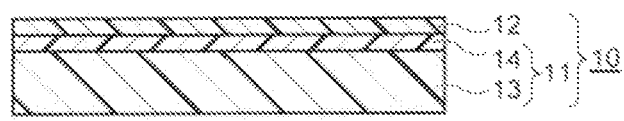
FIG. 1 is a schematic cross-sectional view of an embodiment of a barrier laminate according to the present invention.

As illustrated in FIG. 1, a barrier laminate 10 according to the present invention includes a multilayer substrate 11 and an evaporated film 12, and the multilayer substrate 11 includes at least a polypropylene resin layer 13 and a surface coating layer 14.

Figure 2:
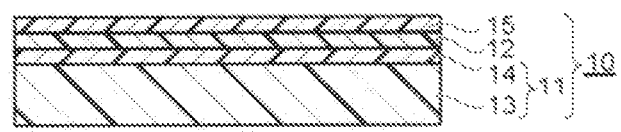
FIG. 2 is a schematic cross-sectional view of an embodiment of a barrier laminate according to the present invention.

In one embodiment, as illustrated in FIG. 2, the barrier laminate 10 according to the present invention further includes a barrier coating layer 15 on the evaporated film 12.

Each layer of a barrier laminate according to the present invention is described below.

The barrier laminate preferably has a haze of 20% or less, more preferably 5% or less. Such a barrier laminate can have improved transparency.

In the present description, the haze of a barrier laminate is measured with a haze meter (Murakami Color Research Laboratory) in accordance with JIS K 7105: 1981.

(Multilayer Substrate)

The multilayer substrate includes a polypropylene resin layer and a surface coating layer.

(Polypropylene Resin Layer)

The polypropylene resin layer comprises polypropylene. The polypropylene resin layer may have a monolayer structure or a multilayer structure.

A multilayer substrate with a layer comprising polypropylene can improve the oil resistance of a packaging container produced using the multilayer substrate.

The polypropylene resin layer is a film subjected to a stretching process. The stretching process may be uniaxial stretching or biaxial stretching.

The stretch ratio of the polypropylene resin layer in the machine direction (MD direction) and the transverse direction (TD direction) preferably ranges from 2 to 15, preferably 5 to 13.

A stretch ratio of 2 or more can further improve the strength and heat resistance of the polypropylene resin layer. This can also improve printability on the polypropylene resin layer.

The stretch ratio is preferably 15 or less in terms of the rupture limit of the polypropylene resin layer.

The polypropylene in the polypropylene resin layer may be any of a homopolymer, a random copolymer, and a block copolymer.

A polypropylene homopolymer is a polymer of propylene alone. A polypropylene random copolymer is a random copolymer of propylene and an α-olefin other than propylene (for example, ethylene, butene-1,4-methyl-1-pentene, etc.). A polypropylene block copolymer is a copolymer with a polymer block composed of propylene and a polymer block composed of the α-olefin other than propylene.

Among these polypropylenes, a homopolymer or a random copolymer is preferably used in terms of transparency. When the rigidity and heat resistance of a packaging container are regarded as important, a homopolymer is preferably used. When the impact resistance or the like of a packaging container is regarded as important, a random copolymer is preferably used.

Biomass-derived polypropylene or mechanically or chemically recycled polypropylene can also be used.

The polypropylene content of the polypropylene resin layer is preferably 70% or more by mass, more preferably 80% or more by mass, still more preferably 90% or more by mass.

The polypropylene resin layer may contain a resin material other than polypropylene without losing the features of the present invention. Examples of the resin material include polyolefins, such as polyethylene, (meth)acrylic resins, vinyl resins, cellulose resins, polyamide resins, polyesters, and ionomer resins.

The polypropylene resin layer may contain an additive agent without losing the features of the present invention. Examples of the additive agent include cross-linkers, antioxidants, anti-blocking agents, lubricant (slip) agents, ultraviolet absorbers, light stabilizers, fillers, reinforcing agents, antistatic agents, pigments, and modifying resins.

The polypropylene resin layer preferably has a thickness in the range of 10 to 50 μm, more preferably 10 to 40 μm.

The polypropylene resin layer with a thickness of 10 μm or more can further improve the strength and heat resistance of the multilayer substrate.

The polypropylene resin layer with a thickness of 50 μm or less can further improve the film-forming properties and processability of the multilayer substrate.

The polypropylene resin layer may have a print layer on its surface. Any image, such as a letter, a pattern, a symbol, or a combination thereof, may be formed on the print layer.

The print layer can be formed on the substrate using a biomass-derived ink. This can reduce the environmental load.

The print layer may be formed by any method, for example, a known printing method, such as a gravure printing method, an offset printing method, or a flexographic printing method.

The polypropylene resin layer may be subjected to surface treatment. This can improve adhesiveness to the surface coating layer.

Any surface treatment method may be used, for example, physical treatment, such as corona discharge treatment, ozone treatment, low-temperature plasma treatment using oxygen gas and/or nitrogen gas, or glow discharge treatment, or chemical treatment, such as oxidation treatment using a chemical.

(Surface Coating Layer)

The multilayer substrate includes a surface coating layer containing a resin material with a polar group on the polypropylene resin layer, and an evaporated film with high adhesiveness can be formed on the surface coating layer to improve gas barrier properties.

As described later, a packaging container produced using a barrier laminate including a surface coating layer has high laminate strength.

The surface coating layer contains a resin material with a polar group. In the present invention, the polar group refers to a group with at least one heteroatom, for example, an ester group, an epoxy group, a hydroxy group, an amino group, an amide group, a carboxy group, a carbonyl group, a carboxylic anhydride group, a sulfone group, a thiol group, or a halogen group.

Among these, from the perspective of the laminating properties of a packaging container, a carboxy group, a carbonyl group, an ester group, a hydroxy group, and an amino group are preferred, and a carboxy group and a hydroxy group are more preferred.

The resin material with a polar group is preferably an ethylene vinyl alcohol copolymer (EVOH), poly(vinyl alcohol) (PVA), a polyester, poly(ethylene imine), a (meth) acrylic resin with a hydroxy group, or a polyamide, such as nylon 6, nylon 6,6, MXD nylon, amorphous nylon, or a polyurethane, more preferably a (meth)acrylic resin with a hydroxy group, an ethylene vinyl alcohol copolymer, or poly(vinyl alcohol). The resin material with a polar group is particularly preferably a (meth)acrylic resin with a hydroxy group in terms of gas barrier properties after heating.

The use of such a resin material can significantly improve the adhesiveness of an evaporated film formed on a surface coating layer and can effectively improve gas barrier properties.

In the present invention, the surface coating layer can be formed using an aqueous emulsion or a solvent emulsion. Specific examples of the aqueous emulsion include polyamide emulsions, polyethylene emulsions, and polyurethane emulsions. Specific examples of the solvent emulsion include polyester emulsions.

The amount of the resin material with a polar group in the surface coating layer is preferably 70% or more by mass, more preferably 80% or more by mass, still more preferably 90% or more by mass.

The surface coating layer may contain a resin material other than the resin material with a polar group without losing the features of the present invention.

The surface coating layer may contain an additive agent without losing the features of the present invention. Examples of the additive agent include cross-linkers, anti-oxidants, anti-blocking agents, lubricant (slip) agents, ultraviolet absorbers, light stabilizers, fillers, reinforcing agents, antistatic agents, pigments, and modifying resins.

The surface coating layer preferably has a thickness in the range of 0.08% to 20%, more preferably 0.2% to 20%, still more preferably 1% to 20%, still more preferably 3% to 10%, of the total thickness of the multilayer substrate.

The surface coating layer with a thickness of 0.08% or more of the total thickness of the multilayer substrate can further improve the adhesiveness of an evaporated film and can further improve gas barrier properties. This can also further improve the laminate strength of a packaging container.

The surface coating layer with a thickness of 20% or less of the total thickness of the multilayer substrate can further improve the processability of the multilayer substrate. As described later, this can also improve the recyclability of a packaging container produced using a laminate of a barrier laminate according to the present invention and a sealant layer formed of polypropylene.

The surface coating layer preferably has a thickness in the range of 0.02 to 10 μm, more preferably 0.05 to 10 μm, still more preferably 0.1 to 10 μm, still more preferably 0.2 to 5 μm.

The surface coating layer with a thickness of 0.02 μm or more can further improve the adhesiveness of an evaporated film and can further improve gas barrier properties. This can also further improve the laminate strength of a packaging container.

The surface coating layer with a thickness of 10 μm or less can further improve the processability of the multilayer substrate. As described later, this can also improve the recyclability of a packaging container produced using a laminate of a barrier laminate according to the present invention and a sealant layer formed of polypropylene.

A multilayer substrate can be produced off-line. More specifically, a multilayer substrate can be produced by forming a resin film of a resin composition containing polypropylene by a T-die method, an inflation method, or the like, stretching the resin film, applying a coating liquid for forming a surface coating layer to the resin film, and drying the coating liquid.

A multilayer substrate can also be produced in-line. More specifically, a multilayer substrate can be produced by forming a resin film of a resin composition containing polypropylene by a T-die method, an inflation method, or the like, stretching the resin film in the machine direction (MD direction), applying a coating liquid for forming a surface coating layer to the resin film, drying the coating liquid, and stretching the resin film in the transverse direction (TD direction). The stretching in the transverse direction may be performed first.

(Evaporated Film)

A barrier laminate according to the present invention includes an evaporated film comprising an inorganic oxide on a surface coating layer. This can improve the gas barrier properties, more specifically, oxygen barrier properties and moisture barrier properties, of the barrier laminate. Furthermore, a packaging container produced using a barrier laminate according to the present invention can reduce the mass loss of the contents of the packaging container.

Examples of the inorganic oxide include aluminum oxide (alumina), silicon oxide (silica), magnesium oxide, calcium oxide, zirconium oxide, titanium oxide, boron oxide, hafnium oxide, barium oxide, and silicon carbide oxide (silicon oxide containing carbon).

Among these, silica, silicon carbide oxide, and alumina are preferred.

In one embodiment, the inorganic oxide is more preferably silica because aging after the evaporated film is formed is not necessary.

In one embodiment, the inorganic oxide is more preferably silicon oxide containing carbon because even bending the barrier laminate causes a smaller decrease in gas barrier properties.

The evaporated film preferably has a thickness in the range of 1 to 150 nm, more preferably 5 to 60 nm, still more preferably 10 to 40 nm.

The evaporated film with a thickness of 1 nm or more can further improve the oxygen barrier properties and moisture barrier properties of the barrier laminate.

The evaporated film with a thickness of 150 nm or less can prevent cracking in the evaporated film. As described later, this can also improve the recyclability of a packaging container produced using a laminate of a barrier laminate according to the present invention and a sealant layer formed of polypropylene.

The evaporated film can be formed by a known method, for example, a physical vapor deposition method (PVD method), such as a vacuum evaporation method, a sputtering method, or an ion plating method, or a chemical vapor deposition method (CVD method), such as a plasma chemical vapor deposition method, a thermal chemical vapor deposition method, or a photochemical vapor deposition method.

The evaporated film may be monolayer formed by a single evaporation process or multilayer formed by a plurality of evaporation processes. Each layer of multiple layers may be formed of the same material or different materials. Each layer may be formed by the same method or by different methods.

An apparatus used for a method of forming an evaporated film by a PVD method can be a vacuum film-forming apparatus with plasma assistance.

One embodiment of a method of forming an evaporated film using a vacuum film-forming apparatus with plasma assistance is described below.

Figure 3:
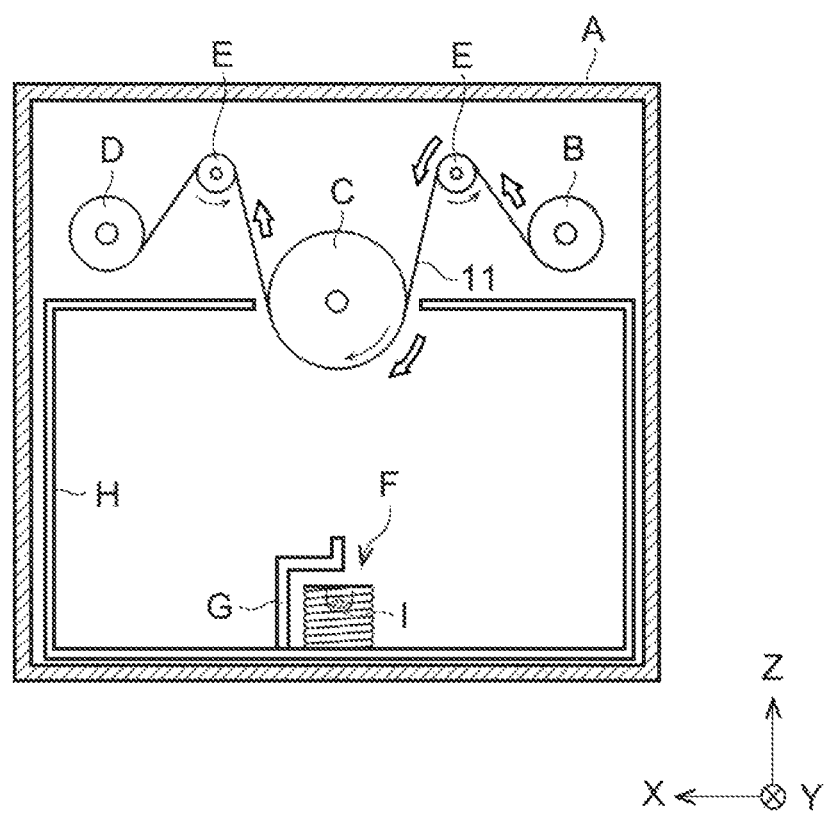
FIG. 3 is a schematic cross-sectional view of an embodiment of a deposition apparatus.
Figure 4:
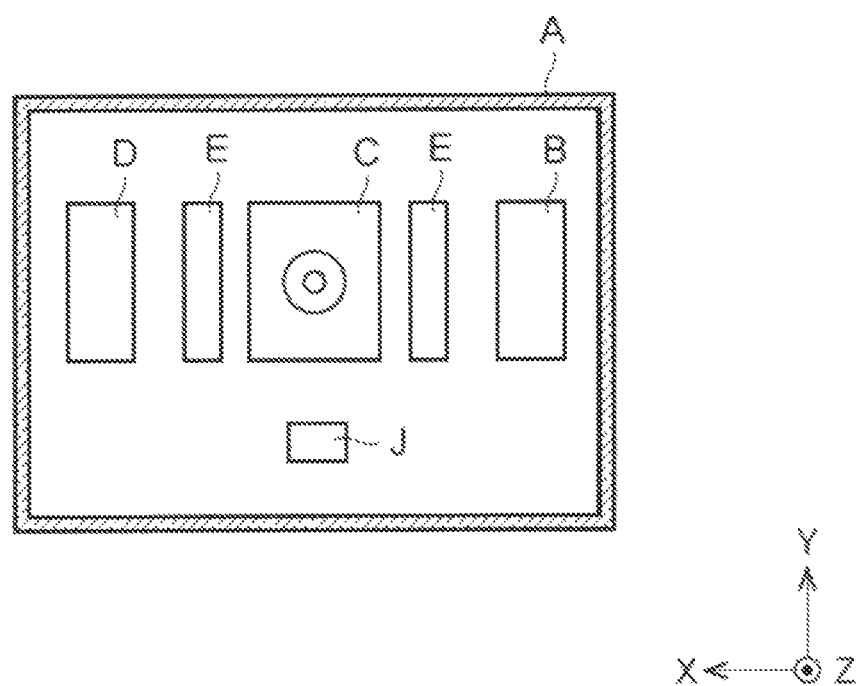
FIG. 4 is a schematic cross-sectional view of an embodiment of a deposition apparatus.

In one embodiment, as illustrated in FIGS. 3 and 4, a vacuum film-forming apparatus includes a vacuum chamber A, an unwinder B, a film-forming drum C, a winder D, a feed roller E, an evaporation source F, a reaction gas supply unit G, an anti-deposition box H, a deposition material I, and a plasma gun J.

FIG. 3 is a schematic cross-sectional view of the vacuum film-forming apparatus in the XZ plane direction. FIG. 4 is a schematic cross-sectional view of the vacuum film-forming apparatus in the XY plane direction.

As illustrated in FIG. 3, the multilayer substrate 11 wound by the film-forming drum C is placed in an upper portion of the vacuum chamber A with the surface coating layer thereof facing downward, and the anti-deposition box H electrically grounded is located below the film-forming drum C in the vacuum chamber A. The evaporation source F is located at the bottom of the anti-deposition box H. The film-forming drum C is placed in the vacuum chamber A such that a surface of the surface coating layer of the multilayer substrate 11 wound by the film-forming drum C faces the upper surface of the evaporation source F with a predetermined distance therebetween.

The feed roller E is placed between the unwinder B and the film-forming drum C and between the film-forming drum C and the winder D.

The vacuum chamber is coupled to a vacuum pump (not shown).

The evaporation source F holds the deposition material I and has a heater (not shown).

The reaction gas supply unit G is a portion for supplying a reactant gas (oxygen, nitrogen, helium, argon, a gas mixture thereof, etc.) that reacts with the evaporated deposition material.

The deposition material I heated and evaporated from the evaporation source F is diffused toward the surface coating layer of the multilayer substrate 11, and simultaneously the surface coating layer is irradiated with plasma from the plasma gun J. Thus, an evaporated film is formed.

Details of this formation method are disclosed in Japanese Unexamined Patent Application Publication No. 2011-214089.

A plasma generator for use in the plasma chemical vapor deposition method may be a high-frequency plasma, pulse wave plasma, or microwave plasma generator. An apparatus with two or more film-forming chambers may also be used. Such an apparatus preferably has a vacuum pump to maintain a vacuum in each film-forming chamber.

The degree of vacuum in each film-forming chamber preferably ranges from $1\times10$ to $1\times10^{-6}$ Pa.

One embodiment of a method of forming an evaporated film using a plasma generator is described below.

First, a multilayer substrate is sent to a film-forming chamber and is transported via an auxiliary roller onto a cooling/electrode drum at a predetermined speed.

Subsequently, a gas mixture composition that contains a film-forming monomer gas containing an inorganic oxide, an oxygen gas, an inert gas, and the like is supplied from a gas supply unit into a film-forming chamber, plasma is generated by glow discharge on a surface coating layer, and the surface coating layer is irradiated with the plasma. Thus, an evaporated film containing the inorganic oxide is formed on the surface coating layer.

Details of this formation method are disclosed in Japanese Unexamined Patent Application Publication No. 2012-076292.

Figure 5:
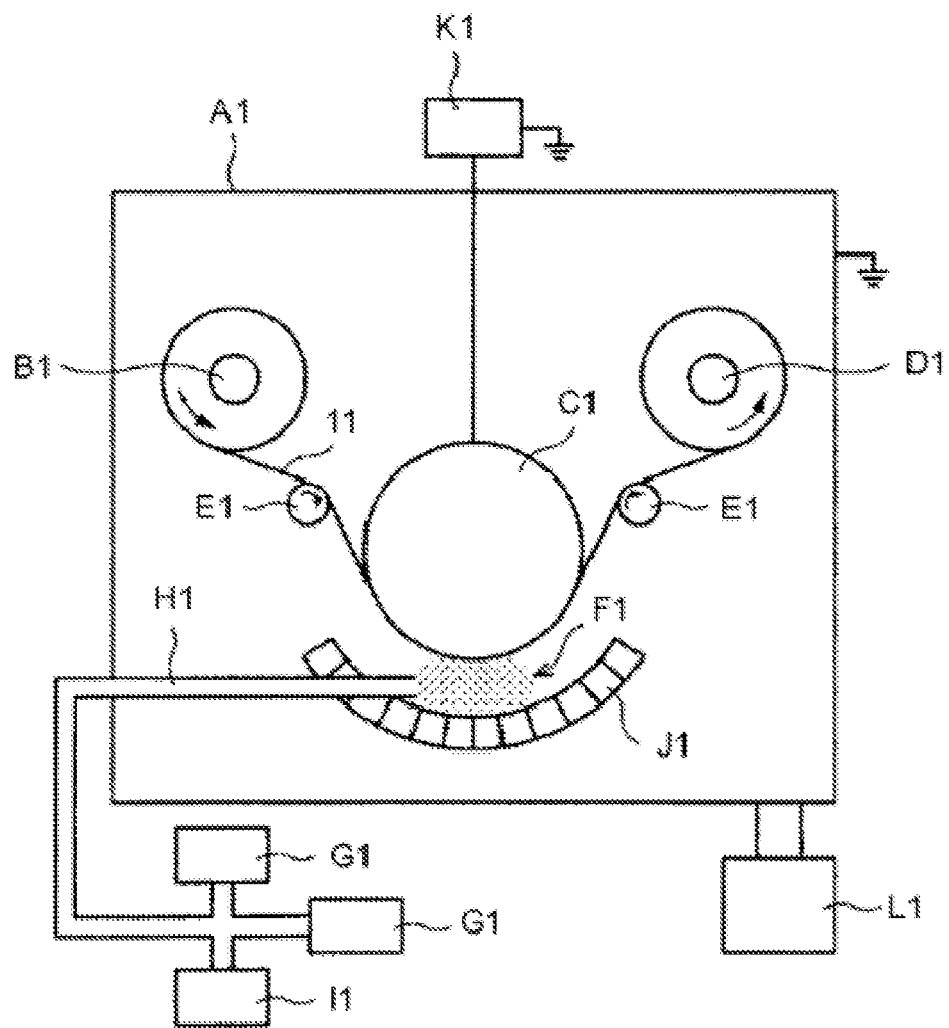
FIG. 5 is a schematic cross-sectional view of another embodiment of a deposition apparatus.

FIG. 5 is a schematic view of a plasma chemical vapor deposition apparatus for use in the CVD method.

In one embodiment, in the plasma chemical vapor deposition apparatus illustrated in FIG. 5, the multilayer substrate 11 is sent from an unwinder B1 in a vacuum chamber A1 and is transported onto the surface of a cooling/electrode drum C1 at a predetermined speed via a feed roller E1. Oxygen, nitrogen, helium, argon, and a gas mixture thereof are supplied from a reaction gas supply unit G1, and a film-forming monomer gas and the like are supplied from a raw material gas supply unit I1, thereby adjusting a gas mixture composition for evaporation composed thereof. The gas mixture composition for evaporation is introduced into the vacuum chamber A1 through a raw material supply nozzle H1. The surface coating layer of the multilayer substrate 11 transported onto the surface of the cooling/electrode drum C1 is irradiated with plasma generated by glow discharge plasma F1 to form an evaporated film. At that time, predetermined electric power from a power supply K1 located outside the vacuum chamber A1 is applied to the cooling/electrode drum C1, and a magnet 31 located near the cooling/electrode drum C1 promotes the generation of plasma. After the evaporated film is formed, the multilayer substrate 11 is then wound by the winder D1 via the feed roller E1 at a predetermined winding speed. In the figure, L1 denotes a vacuum pump.

An apparatus for use in a method of forming an evaporated film may be a continuous evaporated-film-forming apparatus with a plasma pretreatment chamber and a film-forming chamber.

One embodiment of a method of forming an evaporated film using the apparatus is described below.

First, in the plasma pretreatment chamber, a surface coating layer of a multilayer substrate is irradiated with plasma from a plasma supply nozzle. In the film-forming chamber, an evaporated film is then formed on the plasma-treated surface coating layer.

Details of this formation method are disclosed in International Publication No. WO 2019/087960.

The surface of the evaporated film is preferably subjected to the surface treatment. This can improve adhesiveness to an adjacent layer.

In a barrier laminate according to the present invention, the evaporated film is preferably an evaporated film formed by the CVD method, more preferably an evaporated film of silicon oxide containing carbon formed by the CVD method. This can reduce the decrease in gas barrier properties even when the barrier laminate is bent.

The evaporated film of silicon oxide containing carbon contains silicon, oxygen, and carbon. The carbon content C of the evaporated film of silicon oxide containing carbon preferably ranges from 3% to 50%, more preferably 5% to 40%, still more preferably 10% to 35%, of the total (100%) of three elements of silicon, oxygen, and carbon.

In the evaporated film of silicon oxide containing carbon, a carbon content C in such a range can result in a smaller decrease in gas barrier properties even when the barrier laminate is bent.

In the present description, each element content is on a molar basis.

In one embodiment of the evaporated film of silicon oxide containing carbon, the silicon content Si preferably ranges from 1% to 45%, more preferably 3% to 38%, still more preferably 8% to 33%, of the total (100%) of three elements of silicon, oxygen, and carbon. The oxygen content O preferably ranges from 10% to 70%, more preferably 20% to 65%, still more preferably 25% to 60%, of the total (100%) of three elements of silicon, oxygen, and carbon.

In the evaporated film of silicon oxide containing carbon, a silicon content Si and an oxygen content O in such a range can result in a much smaller decrease in gas barrier properties even when the barrier laminate is bent.

In one embodiment of the evaporated film of silicon oxide containing carbon, the oxygen content O is preferably higher than the carbon content C, and the silicon content Si is preferably lower than the carbon content C. The oxygen content O is preferably higher than the silicon content Si. Thus, the content O, the content C, and the content Si in the order of content from highest to lowest are preferred. This can further reduce the decrease in gas barrier properties even when the barrier laminate is bent.

The C content, the Si content, and the O content of the evaporated film of silicon oxide containing carbon can be measured by X-ray photoelectron spectroscopy (XPS) and narrow scan analysis under the following measurement conditions.

(Measurement Conditions)
Equipment used: "ESCA-3400" (manufactured by Kratos)
[1] Spectrum Sampling Conditions
Incident X-rays: MgKα (monochromatic X-rays, hv=1253.6 eV)
X-ray output: 150 W (10 kV, 15 mA)
X-ray scan area (measurement region): approximately 6 mmφ
Photoelectron acceptance angle: 90 degrees
[2] Ion Sputtering Conditions
Ionic species: Ar⁺
Accelerating voltage: 0.2 (kV)
Emission current: 20 (mA)
Etching range: 10 mmφ
Ion sputtering time: 30 seconds to take a spectrum (Barrier Coating Layer)

A barrier laminate according to the present invention may further include a barrier coating layer on the evaporated film. This can improve the oxygen barrier properties and moisture barrier properties of the barrier laminate.

In one embodiment, the barrier coating layer contains a gas barrier resin, such as an ethylene-vinyl alcohol copolymer (EVOH), poly(vinyl alcohol) (PVA), polyacrylonitrile, a polyamide, such as nylon 6, nylon 6,6, or poly(m-xylylene adipamide) (MXD6), a polyester, a polyurethane, or a (meth)acrylic resin. Among these, poly(vinyl alcohol) is preferred in terms of oxygen barrier properties and moisture barrier properties.

Poly(vinyl alcohol) in the barrier coating layer can effectively prevent cracking in the evaporated film.

The gas barrier resin content of the barrier coating layer preferably ranges from 50% to 95% by mass, more preferably 75% to 90% by mass. The barrier coating layer with a gas barrier resin content of 50% or more by mass can have further improved oxygen barrier properties and moisture barrier properties.

The barrier coating layer may contain the additive agent without losing the features of the present invention.

The barrier coating layer preferably has a thickness in the range of 0.01 to 10 μm, more preferably 0.1 to 5 μm.

The barrier coating layer with a thickness of 0.01 μm or more can further improve the oxygen barrier properties and moisture barrier properties. The barrier coating layer with a thickness of 10 μm or less can improve the processability of the barrier laminate. As described later, this can also improve the recyclability of a packaging container produced using a laminate of a barrier laminate and a sealant layer formed of polypropylene.

The barrier coating layer can be formed by dissolving or dispersing the gas barrier resin in water or an appropriate solvent and applying and drying the solution or dispersion. The barrier coating layer can also be formed by applying and drying a commercial barrier coating agent.

In another embodiment, the barrier coating layer is a gas barrier coating film containing at least one resin composition, such as a hydrolysate of a metal alkoxide or a hydrolytic condensate of a metal alkoxide, which is produced by polycondensation of a mixture of the metal alkoxide and a water-soluble polymer by a sol-gel method in the presence of a sol-gel method catalyst, water, an organic solvent, and the like.

Such a barrier coating layer on the evaporated film can effectively prevent cracking in the evaporated film.

In one embodiment, the metal alkoxide is represented by the following general formula.

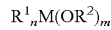

$R^1{}_nM(OR^2)_m$ ($R^1$ and $R^2$ independently denote an organic group having 1 to 8 carbon atoms, M denotes a metal atom, n denotes an integer of 0 or more, m denotes an integer of 1 or more, and n+m denotes the valence of M.)

The metal atom M may be silicon, zirconium, titanium, or aluminum, for example.

Examples of the organic groups represented by R1 and R2 include alkyl groups, such as a methyl group, an ethyl group, a n-propyl group, an i-propyl group, a n-butyl group, and an i-butyl group.

Examples of the metal alkoxide that satisfies the general formula include tetramethoxysilane ($Si(OCH_3)_4$), tetraethoxysilane ($Si(OC_2H_5)_4$), tetrapropoxysilane ($Si(OC_3H_7)_4$), and tetrabutoxysilane ($Si(OC_4H_9)_4$).

The metal alkoxide is preferably used together with a silane coupling agent.

The silane coupling agent may be a known organoalkoxysilane with an organic reactive group and is particularly preferably an organoalkoxysilane with an epoxy group. Examples of the organoalkoxysilane with an epoxy group include γ-glycidoxypropyltrimethoxysilane, γ-glycidoxypropylmethyldiethoxysilane, and β-(3,4-epoxycyclohexyl)ethyltrimethoxysilane.

Two or more of such silane coupling agents may be used. The silane coupling agent is preferably used in the range of approximately 1 to 20 parts by mass per 100 parts by mass of the metal alkoxide in total.

The water-soluble polymer is preferably poly(vinyl alcohol) or an ethylene-vinyl alcohol copolymer, and poly(vinyl alcohol) and the ethylene-vinyl alcohol copolymer are preferably used in combination in terms of oxygen barrier properties, moisture barrier properties, water resistance, and weatherability.

The water-soluble polymer content of the gas barrier coating film preferably ranges from 5 to 500 parts by mass per 100 parts by mass of the metal alkoxide.

The gas barrier coating film with a water-soluble polymer content of 5 parts or more by mass per 100 parts by mass of the metal alkoxide can further improve the oxygen barrier properties and moisture barrier properties of the barrier laminate. The gas barrier coating film with a water-soluble polymer content of 500 parts or less by mass per 100 parts by mass of the metal alkoxide can have improved film-forming properties.

In the gas barrier coating film, the ratio of the metal alkoxide to the water-soluble polymer (metal alkoxide/water-soluble polymer) is preferably 4.5 or less, more preferably 1.0 to 4.5, still more preferably 1.7 to 3.5, based on mass.

When the ratio of the metal alkoxide to the water-soluble polymer is 4.5 or less, even bending the barrier laminate causes a smaller decrease in gas barrier properties.

When the ratio of the metal alkoxide to the water-soluble polymer is 1.0 or more, even heating the barrier laminate causes a smaller decrease in gas barrier properties.

These ratios are solid content ratios.

The ratio of silicon atoms to carbon atoms (Si/C) on the surface of the gas barrier coating film measured by X-ray photoelectron spectroscopy (XPS) is preferably 1.60 or less, more preferably 0.50 to 1.60, still more preferably 0.90 to 1.35.

When the ratio of silicon atoms to carbon atoms is 1.60 or less, even bending the barrier laminate causes a smaller decrease in gas barrier properties.

When the ratio of silicon atoms to carbon atoms is 0.50 or more, even heating the barrier laminate causes a smaller decrease in gas barrier properties.

A ratio of silicon atoms to carbon atoms in such a range can be achieved by appropriately adjusting the ratio of the metal alkoxide to the water-soluble polymer.

In the present description, the ratio of silicon atoms to carbon atoms is on a molar basis.

The ratio of silicon atoms to carbon atoms by X-ray photoelectron spectroscopy (XPS) can be measured by narrow scan analysis under the following measurement conditions.

(Measurement Conditions)
  Equipment used: "ESCA-3400" (manufactured by Kratos)
  [1] Spectrum Sampling Conditions
    Incident X-rays: MgKα (monochromatic X-rays, hv=1253.6 eV)
    X-ray output: 150 W (10 kV, 15 mA)
    X-ray scan area (measurement region): approximately 6 mmφ
    Photoelectron acceptance angle: 90 degrees
  [2] Ion Sputtering Conditions
    Ionic species: $Ar^+$
    Accelerating voltage: 0.2 (kV)
    Emission current: 20 (mA)
    Etching range: 10 mmφ
    Ion sputtering time: 30 seconds+30 seconds+60 seconds (120 seconds in total) to take a spectrum The gas barrier coating film preferably has a thickness in the range of 0.01 to 100 μm, more preferably 0.1 to 50 μm. This can further improve the oxygen barrier properties and moisture barrier properties while maintaining recyclability.

The gas barrier coating film with a thickness of 0.01 μm or more can improve the oxygen barrier properties and moisture barrier properties of the barrier laminate. Such a gas barrier coating film can also prevent cracking in the evaporated film.

The gas barrier coating film with a thickness of 100 μm or less can improve the recyclability of a packaging container produced using a laminate of a barrier laminate according to the present invention and a sealant layer formed of polypropylene.

The gas barrier coating film can be formed by applying a composition containing the above materials by a known means, for example, by roll coating with a gravure roll coater, by spray coating, by spin coating, by dipping, with a brush, with a bar code, or with an applicator, and performing polycondensation of the composition by a sol-gel method.

An acid or an amine compound is suitable for a sol-gel method catalyst. The amine compound is preferably a tertiary amine that is substantially insoluble in water and that is soluble in an organic solvent, for example, N,N-dimethylbenzylamine, tripropylamine, tributylamine, or tripentylamine. Among these, N,N-dimethylbenzylamine is preferred.

The sol-gel method catalyst is preferably used in the range of 0.01 to 1.0 parts by mass, more preferably 0.03 to 0.3 parts by mass, per 100 parts by mass of the metal alkoxide.

When the amount of the sol-gel method catalyst used is 0.01 parts or more by mass per 100 parts by mass of the metal alkoxide, the sol-gel method catalyst can have improved catalytic effects. When the amount of the sol-gel method catalyst used is 1.0 part or less by mass per 100 parts by mass of the metal alkoxide, a gas barrier coating film formed can have a uniform thickness.

The composition may further contain an acid. An acid is used as a catalyst for the sol-gel method, mainly as a catalyst for the hydrolysis of a metal alkoxide, a silane coupling agent, or the like.

Examples of the acid include mineral acids, such as sulfuric acid, hydrochloric acid, and nitric acid, and organic acids, such as acetic acid and tartaric acid. The amount of the acid used preferably ranges from 0.001 to 0.05 mol with respect to the total number of moles of the metal alkoxide and the alkoxide moiety (for example, the silicate moiety) of the silane coupling agent.

When the amount of the acid used is 0.001 mol or more with respect to the total number of moles of the metal alkoxide and the alkoxide moiety (for example, the silicate moiety) of the silane coupling agent, the catalytic effects can be improved. When the amount of the acid used is 0.05 mol or less with respect to the total number of moles of the metal alkoxide and the alkoxide moiety (for example, the silicate moiety) of the silane coupling agent, a gas barrier coating film formed can have a uniform thickness.

The composition preferably contains 0.1 to 100 mol, more preferably 0.8 to 2 mol, of water per mole of the metal alkoxide in total.

When the water content is 0.1 mol or more per mole of the metal alkoxide in total, a barrier laminate according to the present invention can have improved oxygen barrier properties and moisture barrier properties. When the water content is 100 mol or less per mole of the metal alkoxide in total, the hydrolysis reaction can be promoted.

The composition may contain an organic solvent. Examples of the organic solvent include methyl alcohol, ethyl alcohol, n-propyl alcohol, isopropyl alcohol, and n-butanol.

One embodiment of a method of forming a gas barrier coating film is described below.

First, a metal alkoxide, a water-soluble polymer, a sol-gel method catalyst, water, an organic solvent, and, if necessary, a silane coupling agent are mixed to prepare a composition. A polycondensation reaction progresses gradually in the composition.

The composition is then applied to the evaporated film and is dried by the known method described above. The drying further promotes the polycondensation reaction of the metal alkoxide and the water-soluble polymer (and the silane coupling agent when the composition contains the silane coupling agent), thus forming a layer of a composite polymer.

Finally, the composition can be heated in the temperature range of, for example, 20° C. to 250° C., preferably 50° C. to 220° C., for 1 second to 10 minutes to form a gas barrier coating film.

A print layer may be formed on the surface of the barrier coating layer. The method of forming the print layer is described above.

(Heat Sealing Laminate)

Figure 6:
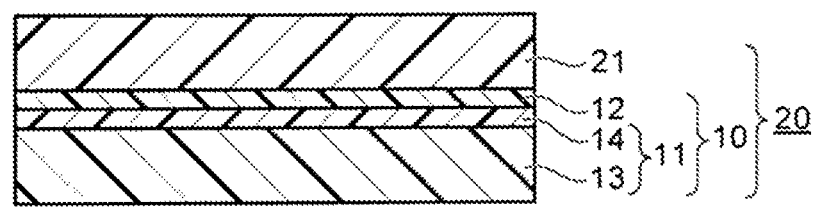
FIG. 6 is a schematic cross-sectional view of an embodiment of a heat sealing laminate according to the present invention.
Figure 7:
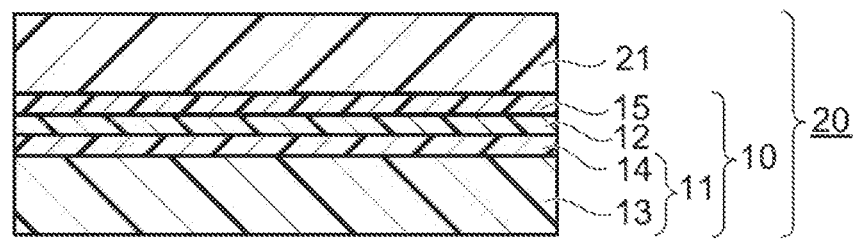
FIG. 7 is a schematic cross-sectional view of an embodiment of a heat sealing laminate according to the present invention.

As illustrated in FIGS. 6 and 7, a heat sealing laminate 20 according to the present invention includes the barrier laminate 10 and a sealant layer 21.

In one embodiment, as illustrated in FIG. 6, the barrier laminate 10 of the heat sealing laminate 20 includes the multilayer substrate 11 and the evaporated film 12, and the multilayer substrate 11 includes at least the polypropylene resin layer 13 and the surface coating layer 14.

In one embodiment, as illustrated in FIG. 7, the barrier laminate 10 of the heat sealing laminate 20 includes the multilayer substrate 11, the evaporated film 12, and the barrier coating layer 15 on the evaporated film 12, and the multilayer substrate 11 includes at least the polypropylene resin layer 13 and the surface coating layer 14.

In the heat sealing laminate, the laminate strength between the multilayer substrate and the evaporated film at a width of 15 mm is preferably 3 N or more, more preferably 4 N or more, still more preferably 5.5 N or more. The upper limit of the laminate strength of the heat sealing laminate may be 20 N or less.

A method for measuring the laminate strength of a heat sealing laminate is described later in Examples.

Each layer of a heat sealing laminate is described below. The barrier laminate is described above and is not described here.

(Sealant Layer)

In one embodiment, the sealant layer can be formed of a resin material that can be fused together by heat.

Examples of the resin material that can be fused together by heat include polyolefins, such as polyethylene, polypropylene, polybutene, methylpentene polymers, and cyclic olefin copolymers. Specific examples include low-density polyethylene (LDPE), medium-density polyethylene (MDPE), high-density polyethylene (HDPE), straight-chain (linear) low-density polyethylene (LLDPE), ethylene/α-olefin copolymers polymerized using a metallocene catalyst, and ethylene-propylene copolymers, such as random and block copolymers of ethylene and propylene.

Examples of the resin material that can be fused together by heat also include ethylene-vinyl acetate copolymers (EVA), ethylene-acrylic acid copolymers (EAA), ethylene-ethyl acrylate copolymers (EEA), ethylene-methacrylic acid copolymers (EMAA), ethylene-methyl methacrylate copolymers (EMMA), ionomer resins, heat-sealing ethylene-vinyl alcohol resins, acid-modified polyolefins produced by modifying polyolefins with an unsaturated carboxylic acid, such as acrylic acid, methacrylic acid, maleic acid, maleic anhydride, fumaric acid, itaconic acid, or the like, polyesters, such as poly(ethylene terephthalate) (PET), poly(vinyl acetate) resins, poly(meth)acrylic resins, and poly(vinyl chloride) resins.

Laminates of a substrate and a sealant layer comprising different resin materials have been used to produce packaging containers. After used packaging containers are collected, however, it is difficult to separate the substrate from the sealant layer, and therefore the used packaging containers are not actively recycled under the present situation.

A substrate and a sealant layer each comprising the same material eliminate the need to separate the substrate from the sealant layer and can improve the recyclability. Thus, the sealant layer preferably comprises polypropylene among the resin materials described above in terms of the recyclability of a packaging container produced using the heat sealing laminate.

The sealant layer comprising polypropylene can improve the oil resistance of a packaging container produced using the heat sealing laminate.

The sealant layer may contain the additive agent without losing the features of the present invention.

The sealant layer may have a monolayer structure or a multilayer structure.

The sealant layer preferably has a thickness in the range of 20 to 100 μm, more preferably 30 to 70 μm.

The sealant layer with a thickness of 20 μm or more can further improve the laminate strength of a packaging container with a heat sealing laminate according to the present invention.

The sealant layer with a thickness of 100 μm or less can further improve the processability of a heat sealing laminate according to the present invention.

(Packaging Container)

A packaging container according to the present invention includes the heat sealing laminate. Examples of the packaging container include packaging products (packaging bags), cover materials, and laminated tubes.

Examples of the packaging bags include packaging bags of various types, such as a standing pouch type, a side seal type, a two sided seal type, a three sided seal type, a four sided seal type, an envelope seal type, a butt seal type (pillow seal type), a ribbed seal type, a flat bottom seal type, a square bottom seal type, and a gusset type.

Figure 8:
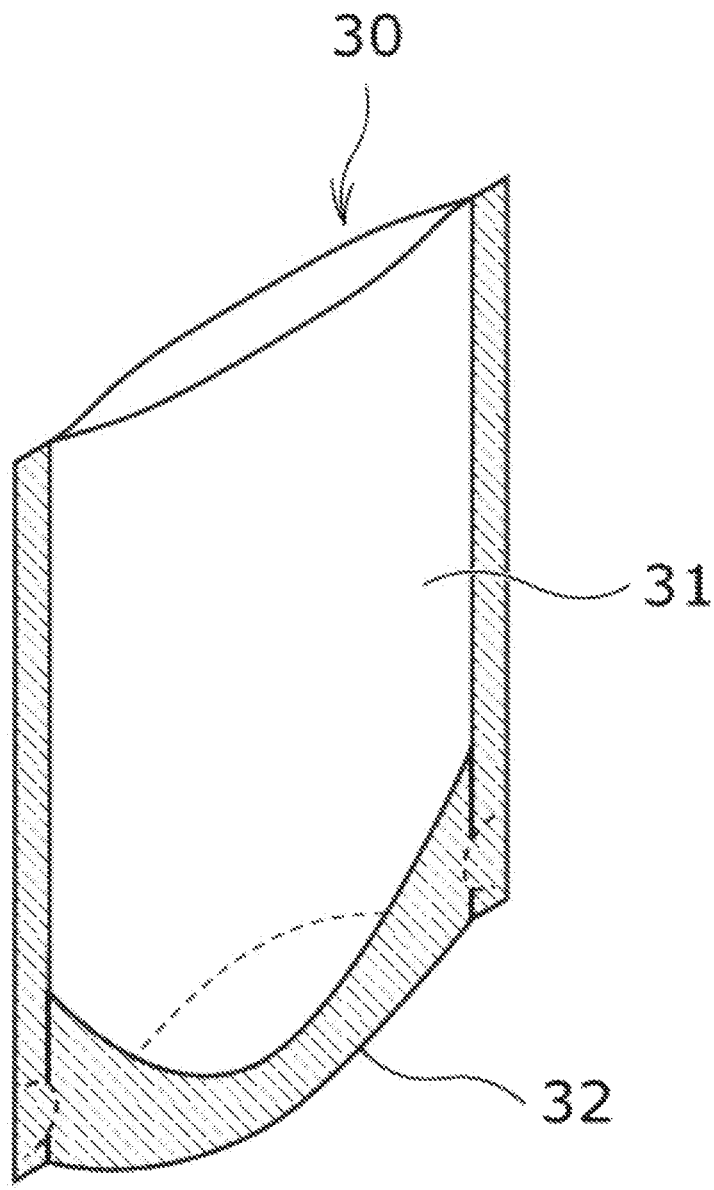
FIG. 8 is a perspective view of an embodiment of a packaging container according to the present invention.

FIG. 8 is a schematic view of an example of a packaging bag of a standing pouch type as an example of a packaging container. As illustrated in FIG. 8, a packaging product 30 is composed of a body (side sheet) 31 and a bottom (bottom sheet) 32. The side sheet 31 and the bottom sheet 32 of the packaging product 30 may comprise the same material or different materials.

In one embodiment, the body 31 of the packaging product 30 can be formed by making a bag such that a heat seal layer of a heat sealing laminate according to the present invention is the innermost layer.

Figure 9:
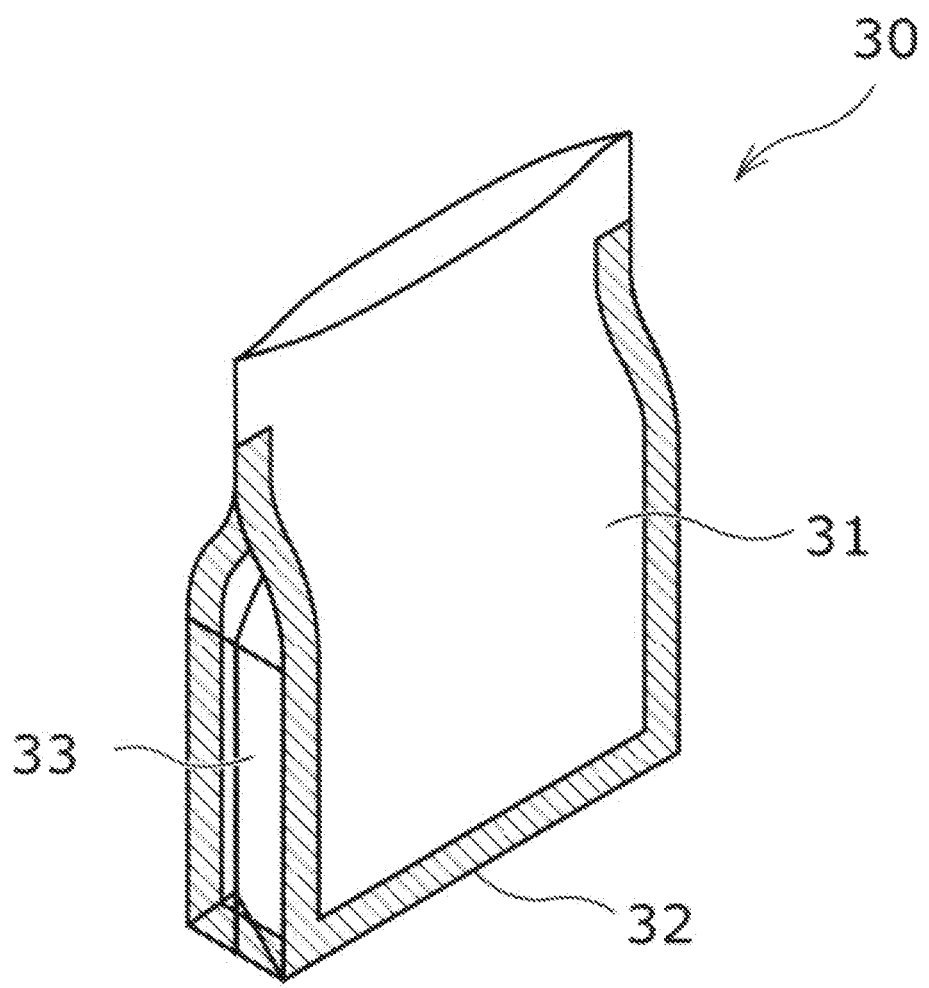
FIG. 9 is a perspective view of an embodiment of a packaging container according to the present invention.

In another embodiment, the side sheet 31 can be formed by preparing two heat sealing laminates according to the present invention, superimposing the heat sealing laminates such that the heat seal layers face each other, inserting from each end of the superimposed heat sealing laminates two laminates folded in a V-shape such that the heat seal layers are on the outside, and heat-sealing the laminates. A packaging container 30 having a body with a gusset 33 as illustrated in FIG. 9 can be produced by such a method.

In one embodiment, the bottom sheet 32 of the packaging container 30 can be formed by inserting a laminate according to the present invention between side sheets made into a bag and by heat-sealing them. More specifically, the bottom sheet 32 can be formed by folding a heat sealing laminate in a V shape such that the heat seal layer is on the outside, inserting the V-shaped laminate between side sheets made into a bag, and heat-sealing them.

Figure 10:
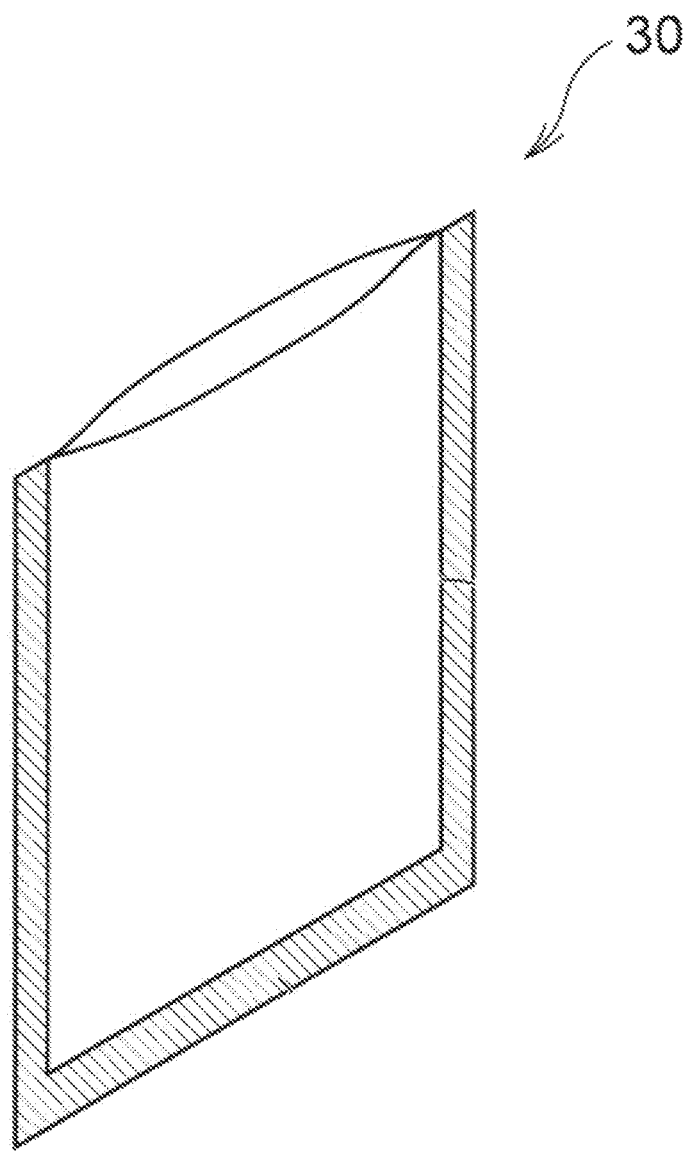
FIG. 10 is a perspective view of an embodiment of a packaging container according to the present invention.

In one embodiment, as illustrated in FIG. 10, the packaging container 30 may be a flat packaging bag without the bottom.

The heat sealing method may be a known method, such as bar sealing, rotating roll sealing, belt sealing, impulse sealing, high-frequency sealing, or ultrasonic sealing.

The contents to be filled in a packaging container may be, but are not limited to, liquid, powder, or gel. The contents may be food or nonfood.

EXAMPLES

Although the present invention is more specifically described in the following examples, the present invention is not limited to these examples.

Example 1-1

A coating liquid for forming a surface coating layer with the following composition was applied to a corona-treated surface of a biaxially stretched polypropylene film with a thickness of 20 µm (ME-1 manufactured by Mitsui Chemicals Tohcello, Inc.) and was dried to form a surface coating layer with a thickness of 0.5 µm, thus preparing a multilayer substrate.

| | |
|---|---|
| Poly(vinyl alcohol) (VC-10 manufactured by Japan Vam & Poval Co., Ltd., the degree of polymerization: 1000, the degree of saponification: 99.3% or more by mole) | 5% by mass |
| Water | 90% by mass |
| Isopropanol (IPA) | 5% by mass |

An evaporated film of silicon oxide containing carbon with a thickness of 12 nm was formed on the surface coating layer of the prepared multilayer substrate using a low-temperature plasma chemical vapor deposition apparatus as a real apparatus while applying tension to the multilayer substrate by roll-to-roll (CVD method). The evaporated film formation conditions are described below.

(Formation Conditions)
　Hexamethyldisiloxane: oxygen gas:helium=1:10:10 (unit: slm)
　Electricity supplied to cooling/electrode drum: 22 kw
　Line speed: 100 m/min In the evaporated film of silicon oxide containing carbon, the carbon content C, the silicon content Si, and the oxygen content O were 32.7%, 29.8%, and 37.5%, respectively, of the total (100%) of three elements of silicon, oxygen, and carbon. Each element content was measured by X-ray photoelectron spectroscopy (XPS) and narrow scan analysis under the following measurement conditions.

(Measurement Conditions)
　Equipment used: "ESCA-3400" (manufactured by Kratos)
　[1] Spectrum Sampling Conditions
　Incident X-rays: MgKα (monochromatic X-rays, hν=1253.6 eV)
　X-ray output: 150 W (10 kV, 15 mA)
　X-ray scan area (measurement region): approximately 6 mmφ
　Photoelectron acceptance angle: 90 degrees
　[2] Ion Sputtering Conditions
　Ionic species: Ar$^+$
　Accelerating voltage: 0.2 (kV)
　Emission current: 20 (mA)
　Etching range: 10 mmφ
　Ion sputtering time: 30 seconds to take a spectrum 385 g of water, 67 g of isopropyl alcohol, and 9.1 g of 0.5 N hydrochloric acid were mixed to prepare a solution with pH of 2.2. The solution was mixed with 175 g of tetraethoxysilane as a metal alkoxide and 9.2 g of glycidoxypropyltrimethoxysilane as a silane coupling agent while cooling to 10° C. to prepare a solution A.

14.7 g of poly(vinyl alcohol) with a degree of saponification of 99% or more and a degree of polymerization of 2400 as a water-soluble polymer, 324 g of water, and 17 g of isopropyl alcohol were mixed to prepare a solution B.

The solution A and the solution B were mixed at 6.5:3.5 based on mass to prepare a barrier coating agent.

The barrier coating agent was applied by a spin coating method to the evaporated film formed on the multilayer substrate and was heat-treated in an oven at 80° C. for 60 seconds to form a barrier coating layer with a thickness of 300 nm, thus preparing a barrier laminate according to the present invention.

Example 1-2

A coating liquid with the following composition for forming a surface coating layer was applied to the corona-treated surface of the biaxially stretched polypropylene film and was dried to form a surface coating layer with a thickness of 0.5 µm, thus preparing a multilayer substrate.

| | |
|---|---|
| EVOH (Eversolve #10 manufactured by Nihon Cima Co., Ltd.) | 75% by mass |
| Water | 12.5% by mass |
| 1-Propanol | 12.5% by mass |

A barrier laminate according to the present invention was prepared in the same manner as in Example 1-1 except that the multilayer substrate thus prepared was used.

Example 1-3

A coating liquid with the following composition for forming a surface coating layer was applied to the corona-treated surface of the biaxially stretched polypropylene film and was dried to form a surface coating layer with a thickness of 0.5 μm, thus preparing a multilayer substrate.
(Composition of Coating Liquid for Forming Surface Coating Layer)

| | |
|---|---|
| Polyester (Pesresin S-680EA manufactured by Takamatsu Oil & Fat Co., Ltd.) | 25% by mass |
| Ethyl acetate | 75% by mass |

A barrier laminate according to the present invention was prepared in the same manner as in Example 1-1 except that the multilayer substrate thus prepared was used.

Example 1-4

A coating liquid with the following composition for forming a surface coating layer was applied to the corona-treated surface of the biaxially stretched polypropylene film and was dried to form a surface coating layer with a thickness of 0.5 μm, thus preparing a multilayer substrate.

| | |
|---|---|
| Poly(ethylene imine) (Epomin P-1000 manufactured by Nippon Shokubai Co., Ltd.) | 60% by mass |
| Methanol | 40% by mass |

A barrier laminate according to the present invention was prepared in the same manner as in Example 1-1 except that the multilayer substrate thus prepared was used.

Example 1-5

A coating liquid for forming a surface coating layer prepared as described below was applied to the corona-treated surface of the biaxially stretched polypropylene film and was dried to form a surface coating layer with a thickness of 0.5 μm, thus preparing a multilayer substrate.

A (meth)acrylic resin with a hydroxy group (number-average molecular weight: 25,000, glass transition temperature: 99° C., hydroxyl value: 80 mgKOHL/g) was diluted with a mixed solvent of methyl ketone and ethyl acetate (mixing ratio: 1:1) to a solid concentration of 10% by mass to prepare a main component.

An ethyl acetate solution containing tolylene diisocyanate (solid content: 75% by mass) was added to the main component as a curing agent to prepare a coating liquid for forming a surface coating layer. The amount of the curing agent used was 10 parts by mass per 100 parts by mass of the main component.

A barrier laminate according to the present invention was prepared in the same manner as in Example 1-1 except that the multilayer substrate thus prepared was used.

Example 1-6

An aqueous polyamide emulsion was applied to the corona-treated surface of the biaxially stretched polypropylene film and was dried to form a surface coating layer with a thickness of 0.5 μm, thus preparing a multilayer substrate.

A barrier laminate according to the present invention was prepared in the same manner as in Example 1-1 except that the multilayer substrate thus prepared was used.

Comparative Example 1-1

A biaxially stretched polypropylene film with a corona-treated surface and with a thickness of 20 μm (ME-1 manufactured by Mitsui Chemicals Tohcello, Inc.) was prepared.

A laminate was prepared in the same manner as in Example 1-1 except that the biaxially stretched polypropylene film was used instead of the multilayer substrate.

Example 2-1

A barrier laminate was prepared in the same manner as in Example 1-1 except that the formation of the evaporated film was changed as described below.

A silicon oxide (silica) evaporated film with a thickness of 20 nm was formed on the surface coating layer using an induction heating vacuum film-forming apparatus with a plasma gun as a real apparatus while applying tension to the multilayer substrate by roll-to-roll (PVD method). The evaporated film formation conditions are described below.
(Formation Conditions)
(Plasma Radiation Conditions)
  Line speed: 30 m/min
  Degree of vacuum: $1.7 \times 10^{-2}$ Pa
  Output: 5.7 kw
  Accelerating voltage: 151 V
  Ar gas flow rate: 7.5 sccm
(Film-Forming Conditions)
  Deposition material: SiO
  Reactant gas: $O_2$
  Reaction gas flow rate: 100 sccm Example 2-2

A coating liquid with the following composition for forming a surface coating layer was applied to the corona-treated surface of the biaxially stretched polypropylene film and was dried to form a surface coating layer with a thickness of 0.5 μm, thus preparing a multilayer substrate.

| | |
|---|---|
| EVOH (Eversolve #10 manufactured by Nihon Cima Co., Ltd.) | 75% by mass |
| Water | 12.5% by mass |
| 1-Propanol | 12.5% by mass |

A barrier laminate according to the present invention was prepared in the same manner as in Example 2-1 except that the multilayer substrate thus prepared was used.

Example 2-3

A coating liquid with the following composition for forming a surface coating layer was applied to the corona-treated surface of the biaxially stretched polypropylene film and was dried to form a surface coating layer with a thickness of 0.5 μm, thus preparing a multilayer substrate.

| | |
|---|---|
| Polyester (Pesresin S-680EA manufactured by Takamatsu Oil & Fat Co., Ltd.) | 25% by mass |
| Ethyl acetate | 75% by mass |

A barrier laminate according to the present invention was prepared in the same manner as in Example 2-1 except that the multilayer substrate thus prepared was used.

Example 2-4

A coating liquid with the following composition for forming a surface coating layer was applied to the corona-treated surface of the biaxially stretched polypropylene film and was dried to form a surface coating layer with a thickness of 0.5 μm, thus preparing a multilayer substrate.

| | |
|---|---|
| Poly(ethylene imine) (Epomin P-1000 manufactured by Nippon Shokubai Co., Ltd.) | 60% by mass |
| Methanol | 40% by mass |

A barrier laminate according to the present invention was prepared in the same manner as in Example 2-1 except that the multilayer substrate thus prepared was used.

Example 2-5

A coating liquid for forming a surface coating layer prepared as described below was applied to the corona-treated surface of the biaxially stretched polypropylene film and was dried to form a surface coating layer with a thickness of 0.5 μm, thus preparing a multilayer substrate.

A (meth)acrylic resin with a hydroxy group (number-average molecular weight: 25,000, glass transition temperature: 99° C., hydroxyl value: 80 mgKOHL/g) was diluted with a mixed solvent of methyl ketone and ethyl acetate (mixing ratio: 1:1) to a solid concentration of 10% by mass to prepare a main component.

An ethyl acetate solution containing tolylene diisocyanate (solid content: 75% by mass) was added to the main component as a curing agent to prepare a coating liquid for forming a surface coating layer. The amount of the curing agent used was 10 parts by mass per 100 parts by mass of the main component.

A barrier laminate according to the present invention was prepared in the same manner as in Example 2-1 except that the multilayer substrate thus prepared was used.

Example 2-6

An aqueous polyamide emulsion was applied to the corona-treated surface of the biaxially stretched polypropylene film and was dried to form a surface coating layer with a thickness of 0.5 μm, thus preparing a multilayer substrate.

A barrier laminate according to the present invention was prepared in the same manner as in Example 2-1 except that the multilayer substrate thus prepared was used.

Comparative Example 2-1

A biaxially stretched polypropylene film with a corona-treated surface and with a thickness of 20 μm (ME-1 manufactured by Mitsui Chemicals Tohcello, Inc.) was prepared.

A laminate was prepared in the same manner as in Example 2-1 except that the biaxially stretched polypropylene film was used instead of the multilayer substrate.

Example 3-1

A barrier laminate was prepared in the same manner as in Example 1-1 except that the formation of the evaporated film was changed as described below.

A continuous evaporated-film-forming apparatus with a pretreatment section including an oxygen plasma pretreatment apparatus and a film-forming section was used as a real apparatus. In the pretreatment section, plasma is introduced from a plasma supply nozzle under the following conditions to perform oxygen plasma pretreatment on the surface coating layer while applying tension to the multilayer substrate by roll-to-roll. In the film-forming section to which the multilayer substrate was continuously transported, an aluminum oxide (alumina) evaporated film with a thickness of 12 nm was formed on the oxygen-plasma-treated surface using a reactive resistance heating system as a heating means for a vacuum evaporation method under the following conditions (PVD method).

(Formation Conditions)
(Oxygen Plasma Pretreatment Conditions)
  Plasma intensity: 200 W·sec/m$^2$
  Plasma-forming gas ratio: oxygen:argon=2:1
  Applied voltage between pretreatment drum and plasma supply nozzle: 340 V
(Film-Forming Conditions)
  Transport speed: 400 m/min
  Oxygen gas supply: 20000 sccm Example 3-2

A coating liquid with the following composition for forming a surface coating layer was applied to the corona-treated surface of the biaxially stretched polypropylene film and was dried to form a surface coating layer with a thickness of 0.5 μm, thus preparing a multilayer substrate.

| | |
|---|---|
| EVOH (Eversolve #10 manufactured by Nihon Cima Co., Ltd.) | 75% by mass |
| Water | 12.5% by mass |
| 1-Propanol | 12.5% by mass |

A barrier laminate according to the present invention was prepared in the same manner as in Example 3-1 except that the multilayer substrate thus prepared was used.

Example 3-3

A coating liquid with the following composition for forming a surface coating layer was applied to the corona-treated surface of the biaxially stretched polypropylene film and was dried to form a surface coating layer with a thickness of 0.5 μm, thus preparing a multilayer substrate.

| | |
|---|---|
| Polyester (Pesresin S-680EA manufactured by Takamatsu Oil & Fat Co., Ltd.) | 25% by mass |
| Ethyl acetate | 75% by mass |

A barrier laminate according to the present invention was prepared in the same manner as in Example 3-1 except that the multilayer substrate thus prepared was used.

Example 3-4

A coating liquid with the following composition for forming a surface coating layer was applied to the corona-treated surface of the biaxially stretched polypropylene film and was dried to form a surface coating layer with a thickness of 0.5 μm, thus preparing a multilayer substrate.

| | |
|---|---|
| Poly(ethylene imine) (Epomin P-1000 manufactured by Nippon Shokubai Co., Ltd.) | 60% by mass |
| Methanol | 40% by mass |

A barrier laminate according to the present invention was prepared in the same manner as in Example 3-1 except that the multilayer substrate thus prepared was used.

Example 3-5

A coating liquid for forming a surface coating layer prepared as described below was applied to the corona-treated surface of the biaxially stretched polypropylene film and was dried to form a surface coating layer with a thickness of 0.5 μm, thus preparing a multilayer substrate.

A (meth)acrylic resin with a hydroxy group (number-average molecular weight: 25,000, glass transition temperature: 99° C., hydroxyl value: 80 mgKOHL/g) was diluted with a mixed solvent of methyl ketone and ethyl acetate (mixing ratio: 1:1) to a solid concentration of 10% by mass to prepare a main component.

An ethyl acetate solution containing tolylene diisocyanate (solid content: 75% by mass) was added to the main component as a curing agent to prepare a coating liquid for forming a surface coating layer. The amount of the curing agent used was 10 parts by mass per 100 parts by mass of the main component.

A barrier laminate according to the present invention was prepared in the same manner as in Example 3-1 except that the multilayer substrate thus prepared was used.

Example 3-6

An aqueous polyamide emulsion was applied to the corona-treated surface of the biaxially stretched polypropylene film and was dried to form a surface coating layer with a thickness of 0.5 μm, thus preparing a multilayer substrate.

A barrier laminate according to the present invention was prepared in the same manner as in Example 3-1 except that the multilayer substrate thus prepared was used.

Comparative Example 3-1

A biaxially stretched polypropylene film with a corona-treated surface and with a thickness of 20 μm (ME-1 manufactured by Mitsui Chemicals Tohcello, Inc.) was prepared.

A laminate was prepared in the same manner as in Example 3-1 except that the biaxially stretched polypropylene film was used instead of the multilayer substrate.

<<Evaluation of Gas Barrier Properties>>

The barrier laminates and laminates prepared in the examples and comparative examples were cut to prepare test specimens. The oxygen permeability (cc/m$^2$·day·atm) and moisture permeability (g/m$^2$·day) of the test specimens were measured by the following method. Tables 1 to 3 summarize the results.

[Oxygen Permeability]

The oxygen permeability of each test specimen was measured with an oxygen permeability measuring apparatus (OX-TRAN 2/20 manufactured by MOCON) at 23° C. and at a relative humidity of 90% RH in accordance with JIS K 7126. The test specimen was set such that the multilayer substrate side was the oxygen supply side.

[Moist Permeability]

The moisture permeability of each test specimen was measured with a moisture permeability measuring apparatus (PERMATRAN-w 3/33 manufactured by MOCON) at 40° C. and at a relative humidity of 90% RH in accordance with JIS K 7129. The test specimen was set such that the multilayer substrate side was the moisture supply side.

<<Laminate Strength Test>>

An unstretched polypropylene film with a thickness of 40 μm was dry-laminated on each barrier coating layer of the barrier laminates and the laminates prepared in the examples and comparative examples to form a sealant layer, thus preparing a heat sealing laminate.

The laminate strength (N/15 mm) between the evaporated film and the surface coating layer and between the evaporated film and the polypropylene film in a test specimen prepared by cutting the heat sealing laminate into a strip with a width of 15 mm was measured with a tensile tester (Tensilon universal testing machine manufactured by Orientec Co., Ltd.) in accordance with JIS K 6854-2 by 90-degree peeling (a T peel method) at a peel rate of 50 mm/min.

Figure 11:
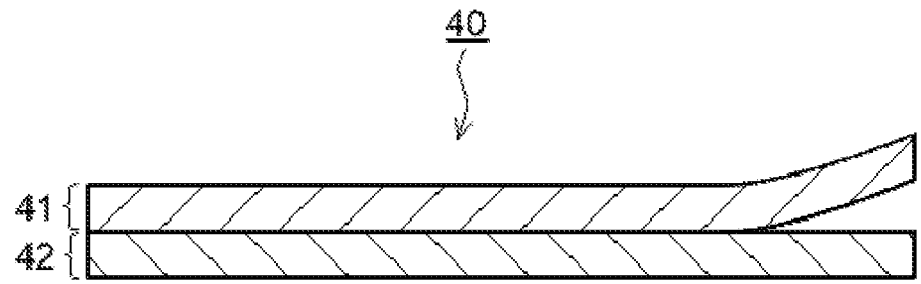
FIG. 11 is a schematic view of an example of a method for measuring laminate strength.
Figure 12:
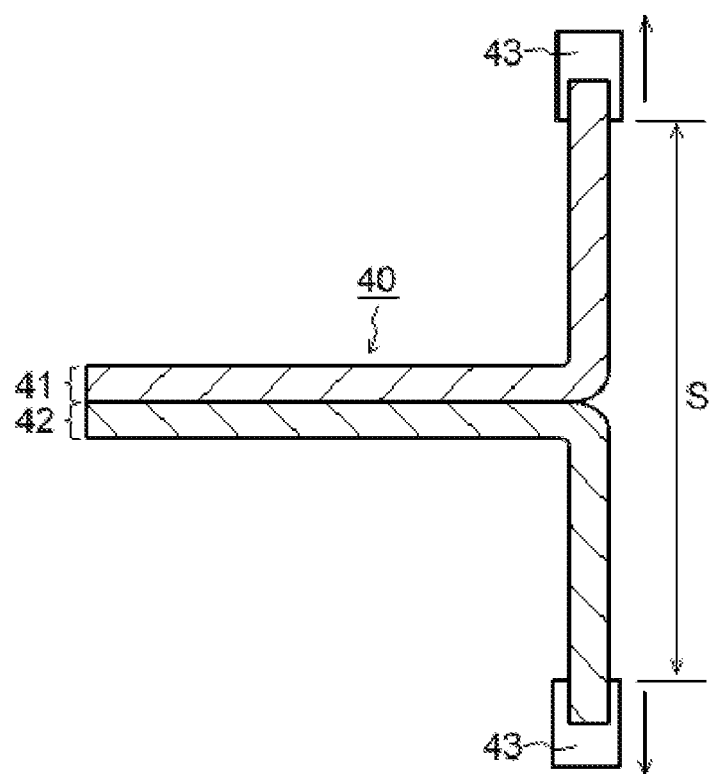
FIG. 12 is a schematic view of an example of a method for measuring laminate strength.
Figure 13:
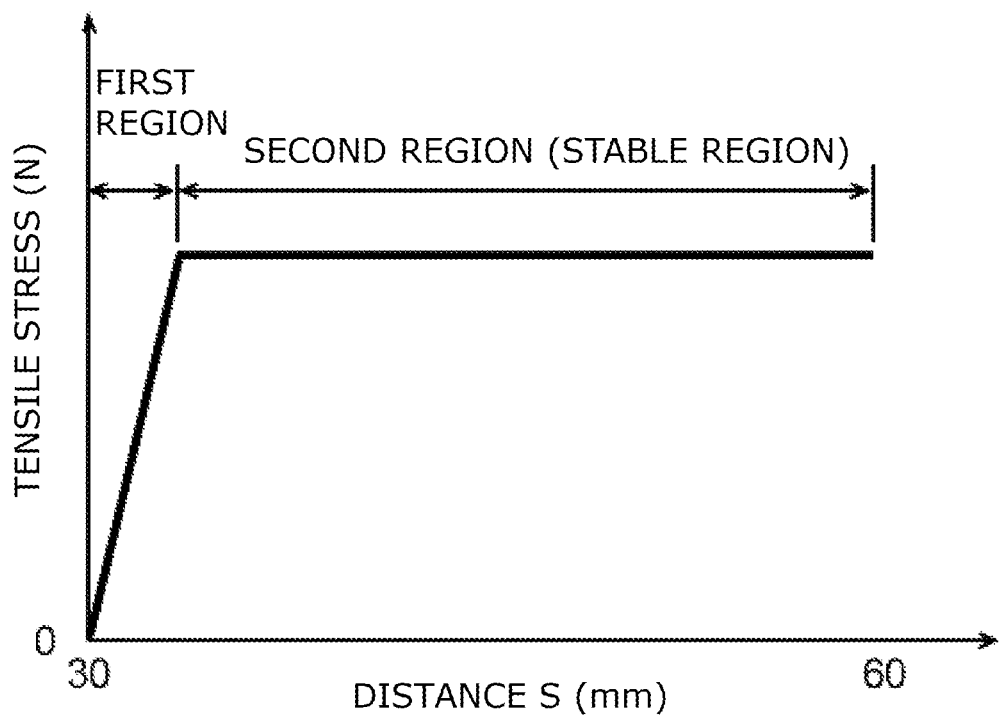
FIG. 13 is a graph showing changes in tensile stress as a function of the distance between a pair of clamps pulling a multilayer substrate and a sealant layer to measure laminate strength.

More specifically, first, the heat sealing laminate was cut to prepare a strip of test specimen 40 in which a multilayer substrate 41 and a sealant layer 42 were separated by 15 mm in the longitudinal direction, as illustrated in FIG. 11. Subsequently, as illustrated in FIG. 12, the separated portions of the multilayer substrate 41 and the sealant layer 42 were held with clamps 43 of the measuring apparatus. The clamps 43 were pulled at a rate of 50 mm/min in the opposite directions perpendicular to the surface between the multilayer substrate 41 and the sealant layer 42 bonded together to measure the average tensile stress in the stable region (see FIG. 13). The distance S between the clamps 43 was 30 mm at the beginning of pulling and was 60 mm at the end of pulling. FIG. 13 is a graph showing changes in tensile stress as a function of the distance S between the clamps 43. As illustrated in FIG. 13, changes in tensile stress as a function of the distance S are first larger in a first region and are then smaller in a second region (stable region).

The average tensile stress of five test specimens 40 in the stable region was measured as laminate strength. The measurement was performed at a temperature of 23° C. and at a relative humidity of 50%. Tables 1 to 3 summarize the measurement results.

TABLE 1

| | Surface coating layer | Evaluation of gas barrier properties | | |
|---|---|---|---|---|
| | | Oxygen permeability (cc/m² · day · atm) | Moisture permeability (g/m² · day) | Laminate strength test (N/15 mm) |
| Example 1-1 | Poly(vinyl alcohol) | 0.1 | 0.3 | 6.3 |
| Example 1-2 | EVOH | 0.1 | 0.5 | 5.9 |
| Example 1-3 | Polyester | 0.2 | 0.7 | 5.8 |
| Example 1-4 | Poly(ethylene imine) | 0.6 | 1.7 | 6.0 |
| Example 1-5 | (Meth)acrylic resin with hydroxy group | 0.2 | 0.6 | 6.4 |
| Example 1-6 | Polyamide | 0.1 | 0.3 | 6.2 |
| Comparative example 1-1 | None | 6.2 | 1.2 | 0.1 |

TABLE 2

| | Surface coating layer | Evaluation of gas barrier properties | | |
|---|---|---|---|---|
| | | Oxygen permeability (cc/m² · day · atm) | Moisture permeability (g/m² · day) | Laminate strength test (N/15 mm) |
| Example 2-1 | Poly(vinyl alcohol) | 0.1 | 0.4 | 6.1 |
| Example 2-2 | EVOH | 0.2 | 0.7 | 5.6 |
| Example 2-3 | Polyester | 0.2 | 0.9 | 5.8 |
| Example 2-4 | Poly(ethylene imine) | 0.9 | 2.0 | 6.2 |
| Example 2-5 | (Meth)acrylic resin with hydroxy group | 0.2 | 0.9 | 5.9 |
| Example 2-6 | Polyamide | 0.1 | 0.6 | 5.7 |
| Comparative example 2-1 | None | 3.9 | 2.0 | 0.1 |

TABLE 3

| | Surface coating layer | Evaluation of gas barrier properties | | |
|---|---|---|---|---|
| | | Oxygen permeability (cc/m² · day · atm) | Moisture permeability (g/m² · day) | Laminate strength test (N/15 mm) |
| Example 3-1 | Poly(vinyl alcohol) | 0.1 | 0.5 | 6.5 |
| Example 3-2 | EVOH | 0.2 | 0.8 | 5.8 |
| Example 3-3 | Polyester | 0.1 | 0.6 | 6.1 |
| Example 3-4 | Polyethylene imine) | 0.8 | 1.9 | 5.7 |
| Example 3-5 | (Meth)acrylic resin with hydroxy group | 0.2 | 0.7 | 6.2 |
| Example 3-6 | Polyamide | 0.1 | 0.4 | 6.3 |
| Comparative example 3-1 | None | 0.6 | 3.5 | 0.1 |

Example 4-1

An unstretched polypropylene film with a thickness of 70 μm was dry-laminated on the barrier coating layer of the barrier laminate prepared in Example 1-1 using a two-component polyurethane adhesive to form a sealant layer, thus preparing a heat sealing laminate.

Example 4-2

A heat sealing laminate was prepared in the same manner as in Example 4-1 except that the barrier laminate prepared in Example 1-2 was used.

Example 4-3

A heat sealing laminate was prepared in the same manner as in Example 4-1 except that the barrier laminate prepared in Example 1-3 was used.

Example 4-4

A heat sealing laminate was prepared in the same manner as in Example 4-1 except that the barrier laminate prepared in Example 1-4 was used.

Example 4-5

A heat sealing laminate was prepared in the same manner as in Example 4-1 except that the barrier laminate prepared in Example 1-5 was used.

Example 4-6

A heat sealing laminate was prepared in the same manner as in Example 4-1 except that the barrier laminate prepared in Example 1-6 was used.

<<Evaluation of Gas Barrier Properties (after Boiling)>>

The heat sealing laminate prepared in Example 4 was used to prepare a flat packaging bag as illustrated in FIG. 10. The flat packaging bag had a B5 size (182 mm×257 mm). The flat packaging bag was filled with 100 mL of water.

The flat packaging bag was boiled at 95° C. for 30 minutes. The heat sealing laminate of the flat packaging bag was cut to prepare test specimens. The oxygen permeability (cc/m²·day·atm) and moisture permeability (g/m²·day) of the test specimens were measured as described above. Table 4 summarizes the results.

<<Laminate Strength Test (after Boiling)>>

The heat sealing laminate of the flat packaging bag after boiling was cut to prepare test specimens. The laminate strength (N/15 mm) of each test specimen was measured as described above. Table 4 summarizes the results.

<<Evaluation of Gas Barrier Properties (after Retort Process)>>

The heat sealing laminate prepared in Example 4 was used to prepare a flat packaging bag as illustrated in FIG. 10. The flat packaging bag had a B5 size (182 mm×257 mm). The flat packaging bag was filled with 100 mL of water.

The flat packaging bag was subjected to retort sterilization at 121° C. for 30 minutes. The heat sealing laminate of the flat packaging bag was cut to prepare test specimens. The oxygen permeability (cc/m²·day·atm) and moisture permeability (g/m²·day) of the test specimens were measured as described above. Table 4 summarizes the results.

<<Laminate Strength Test (after Retort Process)>>

The heat sealing laminate of the flat packaging bag after the retort sterilization was cut to prepare test specimens. The laminate strength (N/15 mm) of each test specimen was measured as described above. Table 4 summarizes the results.

Example 5-1

A barrier laminate was prepared in the same manner as in Example 1-5 except that the barrier coating layer was formed such that the solid content ratio of the metal alkoxide to the water-soluble polymer (metal alkoxide/water-soluble polymer) was 5.1 based on mass.

An unstretched polypropylene film with a thickness of 70 μm was then dry-laminated on the barrier coating layer of the barrier laminate using a two-component polyurethane adhesive to form a sealant layer, thus preparing a heat sealing laminate.

Example 5-2

A barrier laminate and a heat sealing laminate were prepared in the same manner as in Example 5-1 except that the barrier coating layer was formed such that the solid content ratio of the metal alkoxide to the water-soluble polymer (metal alkoxide/water-soluble polymer) was 4.1 based on mass.

Example 5-3

A barrier laminate and a heat sealing laminate were prepared in the same manner as in Example 5-1 except that the barrier coating layer was formed such that the solid content ratio of the metal alkoxide to the water-soluble polymer (metal alkoxide/water-soluble polymer) was 3.3 based on mass.

Example 5-4

A barrier laminate and a heat sealing laminate were prepared in the same manner as in Example 5-1 except that the barrier coating layer was formed such that the solid content ratio of the metal alkoxide to the water-soluble polymer (metal alkoxide/water-soluble polymer) was 2.7 based on mass.

Example 5-5

A barrier laminate and a heat sealing laminate were prepared in the same manner as in Example 5-1 except that the barrier coating layer was formed such that the solid

TABLE 4

| Table 4 | Surface coating layer | Evaluation of gas barrier properties | | | | Laminate strength test (N/15mm) | |
|---|---|---|---|---|---|---|---|
| | | Oxygen permeability (cc/m² · day · atm) | | Moisture permeability (g/m² · day) | | | |
| | | After boiling | After retort process | After boiling | After retort process | After boiling | After retort process |
| Example 4-1 | Poly(vinyl alcohol) | 2.3 | 5.2 | 1.9 | 2.9 | 0.1 | 0.1 |
| Example 4-2 | EVOH | 2.1 | 2.9 | 1.7 | 2.6 | 0.3 | 0.1 |
| Example 4-3 | Polyester | 2.8 | 6.8 | 2.9 | 3.9 | 0.1 | 0.1 |
| Example 4-4 | Poly(ethylene imine) | 2.7 | 8.9 | 2.8 | 3.8 | 0.1 | 0.1 |
| Example 4-5 | (Meth)acrylic resin with hydroxy group | 0.3 | 1.2 | 0.6 | 0.6 | 6.2 | 6.1 |
| Example 4-6 | Polyamide | 0.4 | 1.4 | 0.7 | 0.8 | 6.1 | 6.3 | content ratio of the metal alkoxide to the water-soluble polymer (metal alkoxide/water-soluble polymer) was 1.9 based on mass.

Example 5-6

A barrier laminate and a heat sealing laminate were prepared in the same manner as in Example 5-1 except that the barrier coating layer was formed such that the solid content ratio of the metal alkoxide to the water-soluble polymer (metal alkoxide/water-soluble polymer) was 1.5 based on mass.

Example 6-1

A barrier laminate was prepared in the same manner as in Example 2-5 except that the barrier coating layer was formed such that the solid content ratio of the metal alkoxide to the water-soluble polymer (metal alkoxide/water-soluble polymer) was 5.1 based on mass.

An unstretched polypropylene film with a thickness of 70 μm was then dry-laminated on the barrier coating layer of the barrier laminate using a two-component polyurethane adhesive to form a sealant layer, thus preparing a heat sealing laminate.

Example 6-2

A barrier laminate and a heat sealing laminate were prepared in the same manner as in Example 6-1 except that the barrier coating layer was formed such that the solid content ratio of the metal alkoxide to the water-soluble polymer (metal alkoxide/water-soluble polymer) was 4.1 based on mass.

Example 6-3

A barrier laminate and a heat sealing laminate were prepared in the same manner as in Example 6-1 except that the barrier coating layer was formed such that the solid content ratio of the metal alkoxide to the water-soluble polymer (metal alkoxide/water-soluble polymer) was 3.3 based on mass.

Example 6-4

A barrier laminate and a heat sealing laminate were prepared in the same manner as in Example 6-1 except that the barrier coating layer was formed such that the solid content ratio of the metal alkoxide to the water-soluble polymer (metal alkoxide/water-soluble polymer) was 2.7 based on mass.

Example 6-5

A barrier laminate and a heat sealing laminate were prepared in the same manner as in Example 6-1 except that the barrier coating layer was formed such that the solid content ratio of the metal alkoxide to the water-soluble polymer (metal alkoxide/water-soluble polymer) was 1.9 based on mass.

Example 6-6

A barrier laminate and a heat sealing laminate were prepared in the same manner as in Example 6-1 except that the barrier coating layer was formed such that the solid content ratio of the metal alkoxide to the water-soluble polymer (metal alkoxide/water-soluble polymer) was 1.5 based on mass.

Example 7-1

A barrier laminate was prepared in the same manner as in Example 3-5 except that the barrier coating layer was formed such that the solid content ratio of the metal alkoxide to the water-soluble polymer (metal alkoxide/water-soluble polymer) was 5.1 based on mass.

An unstretched polypropylene film with a thickness of 70 μm was then dry-laminated on the barrier coating layer of the barrier laminate using a two-component polyurethane adhesive to form a sealant layer, thus preparing a heat sealing laminate.

Example 7-2

A barrier laminate and a heat sealing laminate were prepared in the same manner as in Example 7-1 except that the barrier coating layer was formed such that the solid content ratio of the metal alkoxide to the water-soluble polymer (metal alkoxide/water-soluble polymer) was 4.1 based on mass.

Example 7-3

A barrier laminate and a heat sealing laminate were prepared in the same manner as in Example 7-1 except that the barrier coating layer was formed such that the solid content ratio of the metal alkoxide to the water-soluble polymer (metal alkoxide/water-soluble polymer) was 3.3 based on mass.

Example 7-4

A barrier laminate and a heat sealing laminate were prepared in the same manner as in Example 7-1 except that the barrier coating layer was formed such that the solid content ratio of the metal alkoxide to the water-soluble polymer (metal alkoxide/water-soluble polymer) was 2.7 based on mass.

Example 7-5

A barrier laminate and a heat sealing laminate were prepared in the same manner as in Example 7-1 except that the barrier coating layer was formed such that the solid content ratio of the metal alkoxide to the water-soluble polymer (metal alkoxide/water-soluble polymer) was 1.9 based on mass.

Example 7-6

A barrier laminate and a heat sealing laminate were prepared in the same manner as in Example 7-1 except that the barrier coating layer was formed such that the solid content ratio of the metal alkoxide to the water-soluble polymer (metal alkoxide/water-soluble polymer) was 1.5 based on mass.

<<Elemental Analysis of Surface of Barrier Coating Layer>>

The ratio of Si element to C element on the surface of the barrier coating layer in each barrier laminate prepared in Examples 5 to 7 was measured. The measurement was performed by X-ray photoelectron spectroscopy (XPS) and narrow scan analysis under the following measurement conditions. Tables 5 to 7 summarize the results.

(Measurement Conditions)

Equipment used: "ESCA-3400" (manufactured by Kratos)

[1] Spectrum Sampling Conditions

Incident X-rays: MgKα (monochromatic X-rays, hv=1253.6 eV)

X-ray output: 150 W (10 kV, 15 mA)

X-ray scan area (measurement region): approximately 6 mmϕ

Photoelectron acceptance angle: 90 degrees

[2] Ion Sputtering Conditions

Ionic species: $Ar^+$

Accelerating voltage: 0.2 (kV)

Emission current: 20 (mA)

Etching range: 10 mmϕ

Ion sputtering time: 30 seconds+30 seconds+60 seconds (120 seconds in total) to take a spectrum <<Evaluation of Gas Barrier Properties (after Lamination)>>

The heat sealing laminates prepared in Examples 5 to 7 were cut to prepare test specimens. The oxygen permeability ($cc/m^2 \cdot day \cdot atm$) and moisture permeability ($g/m^2 \cdot day$) of the test specimens were measured as described above. Tables 5 to 7 summarize the results. In Tables 5 to 7, the units of oxygen permeability and vapor permeability are omitted.

<<Evaluation of Gas Barrier Properties (after Boiling)>>

Each heat sealing laminate prepared in Examples 5 to 7 was used to prepare a flat packaging bag as illustrated in FIG. 10. The flat packaging bag had a B5 size (182 mm×257 mm). The flat packaging bag was filled with 100 mL of water.

The flat packaging bag was boiled at 95° C. for 30 minutes. The heat sealing laminate of the flat packaging bag was cut to prepare test specimens. The oxygen permeability ($cc/m^2 \cdot day \cdot atm$) and moisture permeability ($g/m^2 \cdot day$) of the test specimens were measured as described above. Tables 5 to 7 summarize the results. In Tables 5 to 7, the units of oxygen permeability and vapor permeability are omitted.

<<Evaluation of Gas Barrier Properties (after Retort Process)>>

Each heat sealing laminate prepared in Examples 5 to 7 was used to prepare a flat packaging bag as illustrated in FIG. 10. The flat packaging bag had a B5 size (182 mm×257 mm). The flat packaging bag was filled with 100 mL of water.

The flat packaging bag was subjected to retort sterilization at 121° C. for 30 minutes. The heat sealing laminate of the flat packaging bag was cut to prepare test specimens. The oxygen permeability ($cc/m^2 \cdot day \cdot atm$) and moisture permeability ($g/m^2 \cdot day$) of the test specimens were measured as described above. Tables 5 to 7 summarize the results. In Tables 5 to 7, the units of oxygen permeability and vapor permeability are omitted.

<<Evaluation of Gas Barrier Properties (after Gelbo Flex Test)>>

Cylindrical bags were prepared using the heat sealing laminates prepared in Examples 5 to 7. A Gelbo Flex test according to ASTM F392 was performed on these bags ten times.

Subsequently, the heat sealing laminates of the bags were cut to prepare test specimens. The oxygen permeability ($cc/m^2 \cdot day \cdot atm$) and moisture permeability ($g/m^2 \cdot day$) of the test specimens were measured as described above. Tables 5 to 7 summarize the results. In Tables 5 to 7, the units of oxygen permeability and vapor permeability are omitted.

TABLE 5

| | | | Evaluation of gas barrier properties | | | | | | | |
|---|---|---|---|---|---|---|---|---|---|---|
| | Solid | | After lamination | | After boiling | | After retort process | | After Gelbo Flex | |
| Table 5 | content ratio | Si/C ratio | Oxygen permeability | Moisture permeability | Oxygen permeability | Moisture permeability | Oxygen permeability | Moisture permeability | Oxygen permeability | Moisture permeability |
| Example 5-1 | 5.1 | 1.69 | 2.4 | 3.2 | 2.5 | 3.3 | 3.2 | 3.4 | 5.8 | 3.5 |
| Example 5-2 | 4.1 | 1.45 | 0.2 | 0.6 | 0.3 | 0.6 | 1.2 | 0.6 | 1.9 | 0.7 |
| Example 5-3 | 3.3 | 1.26 | 0.1 | 0.5 | 0.2 | 0.6 | 1.5 | 0.8 | 1.4 | 0.5 |
| Example 5-4 | 2.7 | 1.11 | 0.2 | 0.6 | 0.3 | 0.7 | 1.4 | 0.7 | 1.3 | 0.6 |
| Example 5-5 | 1.9 | 0.92 | 0.1 | 0.7 | 0.3 | 0.7 | 1.6 | 0.8 | 0.9 | 0.8 |
| Example 5-6 | 1.5 | 0.83 | 0.1 | 0.6 | 2.1 | 1.2 | 3.1 | 1.9 | 0.9 | 0.6 |

TABLE 6

| | | | Evaluation of gas barrier properties | | | | | | | |
|---|---|---|---|---|---|---|---|---|---|---|
| | Solid | | After lamination | | After boiling | | After retort process | | After Gelbo Flex | |
| Table 6 | content ratio | Si/C ratio | Oxygen permeability | Moisture permeability | Oxygen permeability | Moisture permeability | Oxygen permeability | Moisture permeability | Oxygen permeability | Moisture permeability |
| Example 6-1 | 5.1 | 1.69 | 3.2 | 3.8 | 3.2 | 3.9 | 3.6 | 4.1 | 5.2 | 4.9 |
| Example 6-2 | 4.1 | 1.45 | 0.2 | 0.8 | 0.2 | 0.8 | 1.3 | 0.9 | 2.9 | 0.7 |

TABLE 6-continued

| Table 6 | Solid content ratio | Si/C ratio | After lamination | | After boiling | | After retort process | | After Gelbo Flex | |
|---|---|---|---|---|---|---|---|---|---|---|
| | | | Oxygen permeability | Moisture permeability | Oxygen permeability | Moisture permeability | Oxygen permeability | Moisture permeability | Oxygen permeability | Moisture permeability |
| Example 6-3 | 3.3 | 1.26 | 0.3 | 0.8 | 0.3 | 0.9 | 1.5 | 0.8 | 2.5 | 0.8 |
| Example 6-4 | 2.7 | 1.11 | 0.2 | 0.7 | 0.3 | 0.8 | 1.5 | 0.8 | 2.3 | 0.8 |
| Example 6-5 | 1.9 | 0.92 | 0.2 | 0.8 | 0.2 | 0.8 | 1.6 | 0.9 | 1.9 | 0.8 |
| Example 6-6 | 1.5 | 0.83 | 0.2 | 0.6 | 2.2 | 1.5 | 3.3 | 2.1 | 1.7 | 0.8 |

TABLE 7

| Table 7 | Solid content ratio | Si/C ratio | After lamination | | After boiling | | After retort process | | After Gelbo Flex | |
|---|---|---|---|---|---|---|---|---|---|---|
| | | | Oxygen permeability | Moisture permeability | Oxygen permeability | Moisture permeability | Oxygen permeability | Moisture permeability | Oxygen permeability | Moisture permeability |
| Example 7-1 | 5.1 | 1.69 | 5.8 | 4.8 | 6.2 | 4.7 | 6.1 | 5.2 | 9.8 | 5.2 |
| Example 7-2 | 4.1 | 1.45 | 0.2 | 0.7 | 0.2 | 0.7 | 1.5 | 0.9 | 4.3 | 0.8 |
| Example 7-3 | 3.3 | 1.26 | 0.2 | 0.6 | 0.3 | 0.8 | 1.4 | 0.8 | 3.8 | 0.7 |
| Example 7-4 | 2.7 | 1.11 | 0.3 | 0.8 | 0.2 | 0.7 | 1.7 | 1.1 | 3.9 | 0.8 |
| Example 7-5 | 1.9 | 0.92 | 0.2 | 0.8 | 0.3 | 0.8 | 1.6 | 0.9 | 3.5 | 0.9 |
| Example 7-6 | 1.5 | 0.83 | 0.2 | 0.7 | 3.6 | 1.8 | 9.8 | 1.8 | 3.2 | 0.9 |

REFERENCE SIGNS LIST

10 barrier laminate, 11 multilayer substrate, 12 evaporated film, 13 polypropylene resin layer, 14 surface coating layer, 15 barrier coating layer, 20 heat sealing laminate, 21 sealant layer, 30 packaging container, 31 body (side sheet), 32 bottom (bottom sheet), 33 gusset, 40 test specimen, 41 multilayer substrate, 42 sealant layer, clamp, A vacuum chamber, B unwinder, C film-forming drum, D winder, E feed roller, F evaporation source, G reaction gas supply unit, H anti-deposition box, I deposition material, 3 plasma gun, A1 vacuum chamber, B1 unwinder, C1 cooling/electrode drum, D1 winder, E1 feed roller, F1 glow discharge plasma, G1 reaction gas supply unit, H1 raw material supply nozzle, I1 raw material gas supply unit, J1 magnet, K1 power supply, L1 vacuum pump

The invention claimed is:

1. A barrier laminate comprising: a multilayer substrate; an evaporated film; and a barrier coating layer on the evaporated film,
    wherein the multilayer substrate includes at least a polypropylene resin layer and a surface coating layer,
    the polypropylene resin layer is subjected to a stretching process,
    the surface coating layer contains a resin material with a polar group,
    the resin material with the polar group is a (meth)acrylic resin with a hydroxy group,
    the evaporated film comprises an inorganic oxide,
    the barrier coating layer is a gas barrier coating film comprising at least one selected from the group consisting of:
    (a) tetraethoxysilane and poly(vinyl alcohol); and
    poly (vinyl alcohol) and a hydrolytic condensate of tetraethoxysilane, and
    a ratio of silicon atoms to carbon atoms (Si/C) on a surface of the gas barrier coating film measured by X-ray photoelectron spectroscopy (XPS) is 0.90 or more and 1.60 or less.

2. The barrier laminate according to claim 1, wherein the surface coating layer has a thickness in a range of 0.08% to 20% of a total thickness of the multilayer substrate.

3. The barrier laminate according to claim 1, wherein the surface coating layer has a thickness in a range of 0.02 to 10 µm.

4. The barrier laminate according to claim 1, wherein the surface coating layer is a layer formed using an aqueous emulsion or a solvent emulsion.

5. The barrier laminate according to claim 1, used for a packaging container.

6. The barrier laminate according to claim 1, wherein the inorganic oxide is silica, silicon carbide oxide, or alumina.

7. A heat sealing laminate comprising: the barrier laminate according to claim 1; and a sealant layer.

8. The heat sealing laminate according to claim 7, wherein the sealant layer comprises the same material as the polypropylene resin layer, and
    the same material is polypropylene.

9. A packaging container comprising the heat sealing laminate according to claim 7.

* * * * *